United States Patent
Takeda et al.

(10) Patent No.: US 10,879,984 B2
(45) Date of Patent: Dec. 29, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/086,928

(22) PCT Filed: Mar. 21, 2017

(86) PCT No.: PCT/JP2017/011087
§ 371 (c)(1),
(2) Date: Sep. 20, 2018

(87) PCT Pub. No.: WO2017/164143
PCT Pub. Date: Sep. 28, 2017

(65) Prior Publication Data
US 2019/0123800 A1    Apr. 25, 2019

(30) Foreign Application Priority Data

Mar. 23, 2016 (JP) .................. 2016-059127

(51) Int. Cl.
*H04B 7/06* (2006.01)
*H04W 24/10* (2009.01)
(Continued)

(52) U.S. Cl.
CPC ......... *H04B 7/0626* (2013.01); *H04L 5/0023* (2013.01); *H04L 5/0048* (2013.01);
(Continued)

(58) Field of Classification Search
CPC ... H04B 7/0626; H04L 5/0023; H04L 5/0044; H04L 5/0048; H04L 5/0057;
(Continued)

(56) References Cited

U.S. PATENT DOCUMENTS 9,749,991 B2    8/2017  Guo et al.
2013/0322376 A1*  12/2013  Marinier .............. H04B 7/2612
                                                        370/329
(Continued)

FOREIGN PATENT DOCUMENTS

JP    2015-520982 A    7/2015
KR    10-2014-0012071 A    1/2014
(Continued)

OTHER PUBLICATIONS

International Search Report issued in PCT/JP2017/011087 dated Jun. 6, 2017 (1 page).
(Continued)

*Primary Examiner* — Saad A. Waqas
(74) *Attorney, Agent, or Firm* — Osha Bergman Watanabe & Burton LLP

(57) ABSTRACT

The present invention is designed to perform DL sounding adequately in future radio communication systems. The user terminal of the present invention has a receiving section that receives a measurement reference signal, a transmission section that transmits channel state information (CSI) which is generated using the measurement reference signal, and a control section that controls reception of the measurement reference signal based on downlink control information (DCI) received in a same subframe as that of the measurement reference signal.

8 Claims, 17 Drawing Sheets

(51) Int. Cl.
*H04L 5/00* (2006.01)
*H04W 72/04* (2009.01)
*H04W 72/12* (2009.01)

(52) U.S. Cl.
CPC .......... *H04L 5/0057* (2013.01); *H04L 5/0087* (2013.01); *H04L 5/0091* (2013.01); *H04W 24/10* (2013.01); *H04W 72/04* (2013.01); *H04W 72/0446* (2013.01); *H04W 72/12* (2013.01); *H04W 72/1263* (2013.01); *H04W 72/1289* (2013.01); *H04L 5/0044* (2013.01); *H04L 5/0064* (2013.01)

(58) Field of Classification Search
CPC ... H04L 5/0064; H04L 5/0087; H04L 5/0091; H04W 24/10; H04W 72/04; H04W 72/0446; H04W 72/12; H04W 72/1263; H04W 72/1289
See application file for complete search history.

(56) References Cited

U.S. PATENT DOCUMENTS

| | | | |
|---|---|---|---|
| 2013/0336150 | A1 | 12/2013 | Abe et al. |
| 2014/0233466 | A1 | 8/2014 | Pourahmadi et al. |
| 2014/0334391 | A1* | 11/2014 | Khoshnevis ...... H04W 72/0413 370/329 |
| 2015/0103774 | A1 | 4/2015 | Nagata et al. |
| 2015/0215022 | A1 | 7/2015 | Nagata et al. |
| 2016/0081067 | A1* | 3/2016 | Xu ...................... H04B 7/0413 370/335 |
| 2017/0063503 | A1* | 3/2017 | Liu ...................... H04L 5/0044 |

FOREIGN PATENT DOCUMENTS

| | | |
|---|---|---|
| WO | 2014/110745 A1 | 7/2014 |
| WO | 2015/023227 A1 | 2/2015 |

OTHER PUBLICATIONS

Written Opinion of the International Searching Authority issued in PCT/JP2017/011087 dated Jun. 6, 2017 (4 pages).
Ericsson; "CSI feedback for FD-MIMO"; 3GPP TSG-RAN WG1#82, R1-154550; Beijing, China; Aug. 24-28, 2015 (5 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in counterpart European Patent Application No. 17770185.1, dated Jun. 7, 2019 (24 pages).
Partial Supplementary European Search Report issued in the counterpart European Patent Application No. 17770185.1, dated Feb. 7, 2019 (18 pages).
Huawei, HiSilicon; "CSI enhancements for TDD eIMTA"; 3GPP TSG RAN WG1 Meeting #75, R1-135012; San Francisco, USA; Nov. 11-15, 2013 (4 pages).
Samsung; "Discussion on aperiodic CSI-RS resource configuration"; 3GPP TSG RAN WG1 Meeting #83, R1-156784; Anaheim, USA; Nov. 15-22, 2015 (3 pages).
ZTE; "Details of Design on DL frame structure and signaling for LAA"; 3GPP TSG RAN WG1 Meeting #83, R1-156988; Anaheim, USA; Nov. 15-22, 2015 (11 pages).
Office Action issued in the counterpart Korean Patent Application No. 10-2018-7026386, dated Jul. 2, 2020 (7 pages).
Office Action issued in the counterpart Korean Patent Application No. 10-2018-7026386, dated Dec. 13, 2019 (4 pages).

* cited by examiner

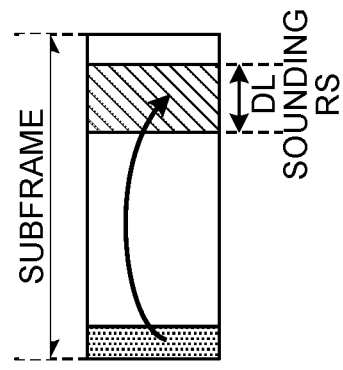
FIG. 3A
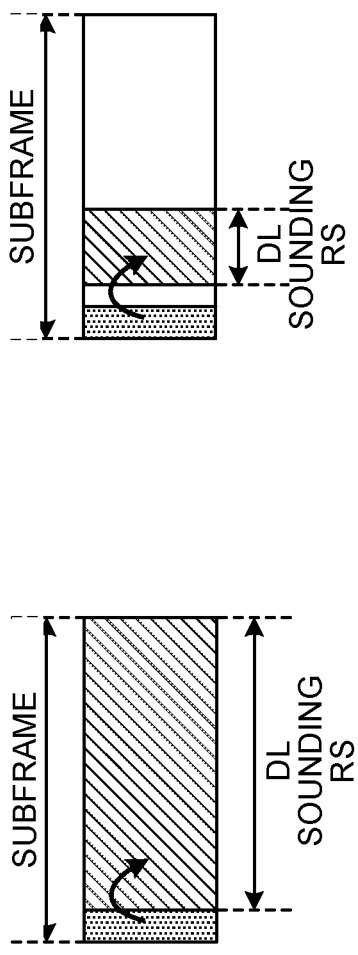
FIG. 3B
FIG. 3C
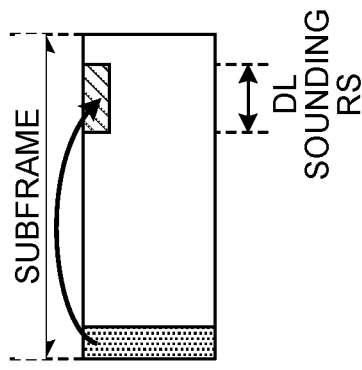
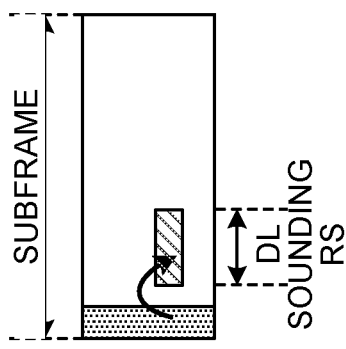
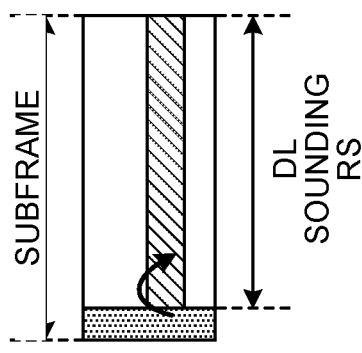
FIG. 3D
FIG. 3E
FIG. 3F

FIG. 4A

| DCI AGG. LV. | NO. OF BLIND DECODINGS ||
| | DCI FOR DL DATA | DCI FOR DL SRS |
| --- | --- | --- |
| 1 | 6 | 2 |
| 2 | 6 | 2 |
| 4 | 2 | 1 |
| 8 | 2 | 1 |

FIG. 4B

| DCI AGG. LV. | NO. OF BLIND DECODINGS ||
| | DCI FOR DL DATA | DCI FOR DL SRS |
| --- | --- | --- |
| 1 | 4 | 2 |
| 2 | 4 | 2 |
| 4 | 1 | 1 |
| 8 | 1 | 1 |

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, successor systems of LTE (referred to as, for example, "LTE-A (LTE-Advanced)," "FRA (Future Radio Access)," "5G (5th generation mobile communication system)," "5G+(5G plus)," "New-RAT (Radio Access Technology)" and so on) are also under study for the purpose of achieving further broadbandization and increased speed beyond LTE.

Existing LTE systems use control based on TDD (Time Division Duplex) and FDD (Frequency Division Duplex). For example, in TDD, whether each subframe in a radio frame is used in the uplink ("UL") or in the downlink ("DL") is determined strictly based on the UL/DL configuration.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Now, for future radio communication systems such as LTE Rel. 13 and/or later versions (for example, 5G), radio frames (also referred to as "lean radio frames") to provide good future scalability and excellent power saving performance are under study. Lean radio frames are based on the assumption of using subframes with no predetermined use (for example, the direction in communication such as DL or UL, the type and format of signals such as data, reference signals, sounding and feedback information, and so on), except for some subframes (dynamic subframe utilization).

However, there is a possibility that the DL sounding method of existing LTE systems (which involves the measurement of channel states (CSI (Channel State Information) and which hereinafter will be referred to as "DL sounding") does not fit in future radio communication systems where dynamic subframe utilization is employed.

To be more specific, in existing LTE systems, DL sounding is done using predetermined subframes or reference signals that are mapped in predetermined locations (for example, resource elements). Due to this, DL sounding in existing LTE systems may fail to provide flexibility and scalability in future radio communication systems where dynamic subframe utilization is employed.

The present invention has been made in view of the above, and it is therefore an object of the present invention to provide a user terminal, a radio base station and a radio communication method that are capable of performing DL sounding adequately in future radio communication systems.

Solution to Problem

A user terminal, according to one aspect of the present invention, has a receiving section that receives a measurement reference signal, a transmission section that transmits channel state information (CSI) which is generated using the measurement reference signal, and a control section that controls reception of the measurement reference signal based on downlink control information (DCI) received in a same subframe as that of the measurement reference signal (DCI).

Advantageous Effects of Invention

According to the present invention, it is possible to perform DL sounding adequately in future radio communication systems.

BRIEF DESCRIPTION OF DRAWINGS

FIG. 3A to FIG. 3F are diagrams to show examples of DL sounding resources according to a first aspect of the present invention;

FIG. 4A and FIG. 4B provide diagrams to show examples of configuration of the number of times blind decoding is performed, according to the first aspect;

DESCRIPTION OF EMBODIMENTS

Figure 1:
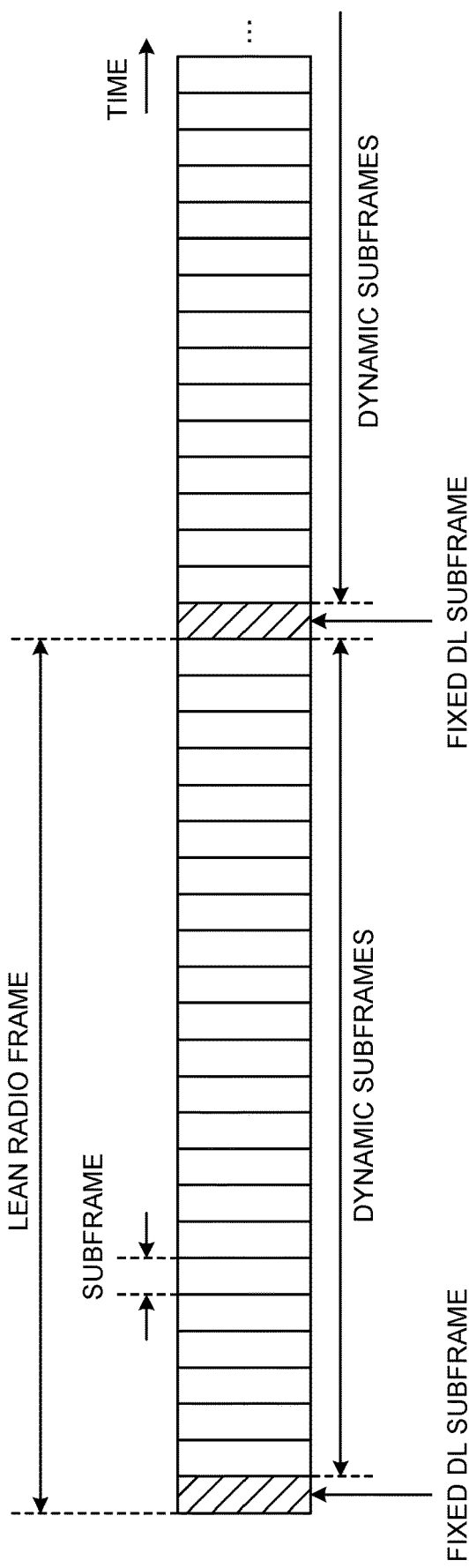
FIG. 1 is a diagram to show an example of the structure of lean radio frames.

An example of a communication method to use lean radio frames (for example, 5G), for future radio communication systems such as LTE Rel. 13 and later versions, will be described below with reference to FIG. 1 and FIG. 2. FIG. 1 is a diagram to show an example of the structure of lean radio frames. As shown in FIG. 1, lean radio frames have a predetermined time duration (for example, five to forty ms). A lean radio frame is comprised of a plurality of subframes, where each subframe has a predetermined time duration (for example, 0.125 ms, 0.25 ms, 1 ms, etc.).

Subframes in lean radio frames have a shorter time duration than the subframes of existing LTE systems (LTE Rel. 8 to 12). As a result of this, subframes in lean radio frames can be transmitted and received in a short time compared to existing LTE systems.

Lean radio frames are comprised of subframes with a predetermined use (also referred to as "fixed subframes") and subframes with no predetermined use (also referred to as "dynamic subframes," "flexible subframes," "dynamically utilized subframes" and so on).

In a lean radio frame, the timing of a fixed subframe may be determined in advance (for example, subframe #0, subframe #5, etc.), or may be configured via higher layer signaling such as RRC (Radio Resource Control) signaling, or via broadcast signaling. Furthermore, fixed subframes may be provided in varying timings, on a per cell basis (that is, the offset value may be determined per cell). For example, referring to FIG. 1, fixed subframes (fixed DL subframes), which are configured in advance as DL subframes, are provided in a predetermined cycle (which is, for example, five ms or more).

Note that multiple fixed DL subframes may be configured in a lean radio frame. In this case, fixed DL subframes are mapped so as to concentrate at a specific time within a lean radio frame (for example, in a specific period of two ms within a cycle of ten ms), so that it is possible to make the cycle of fixed DL subframes longer, and reduce the energy consumption of, for example, radio base stations and user terminals that perform transmission/receipt using fixed DL subframes.

Meanwhile, by mapping fixed DL subframes so as to be distributed within a lean radio frame, it is possible to make the cycle of fixed DL subframes shorter, which can, for example, make it easier to build quality connections with user terminals that move at high speeds. The locations and the cycle of time resources for fixed DL subframes may be selected by a radio base station from a plurality of combinations that are prepared in advance, and a possible combination may be detected by a user terminal on a blind basis, or the locations and the cycle of time resources for fixed DL subframes may be reported from the radio base station to the user terminal via broadcast signals, RRC signaling and so on.

Also, although not shown in the drawings, fixed subframes (fixed UL subframes) that are configured in advance as UL subframes may be provided in lean radio frames. In these fixed UL subframes, resources for the signals (for example, random access preambles) for initial access (stand-alone operation) to cells using lean radio frames may be reserved.

Also, the use of dynamic subframes may be designated using a DL control signal (also referred to as a "DL control channel," an "L1/L2 control signal," an "L1/L2 control channel" and so on) in each dynamic subframe (dynamic assignment), or may be designated by fixed DL subframes (semi-dynamic assignment). Thus, when dynamic subframe utilization is employed, the use of subframes may be specified dynamically on a per subframe basis, or may be specified semi-dynamically for every predetermined number of subframes (for example, every multiple dynamic subframes between fixed DL subframes).

Figure 2:
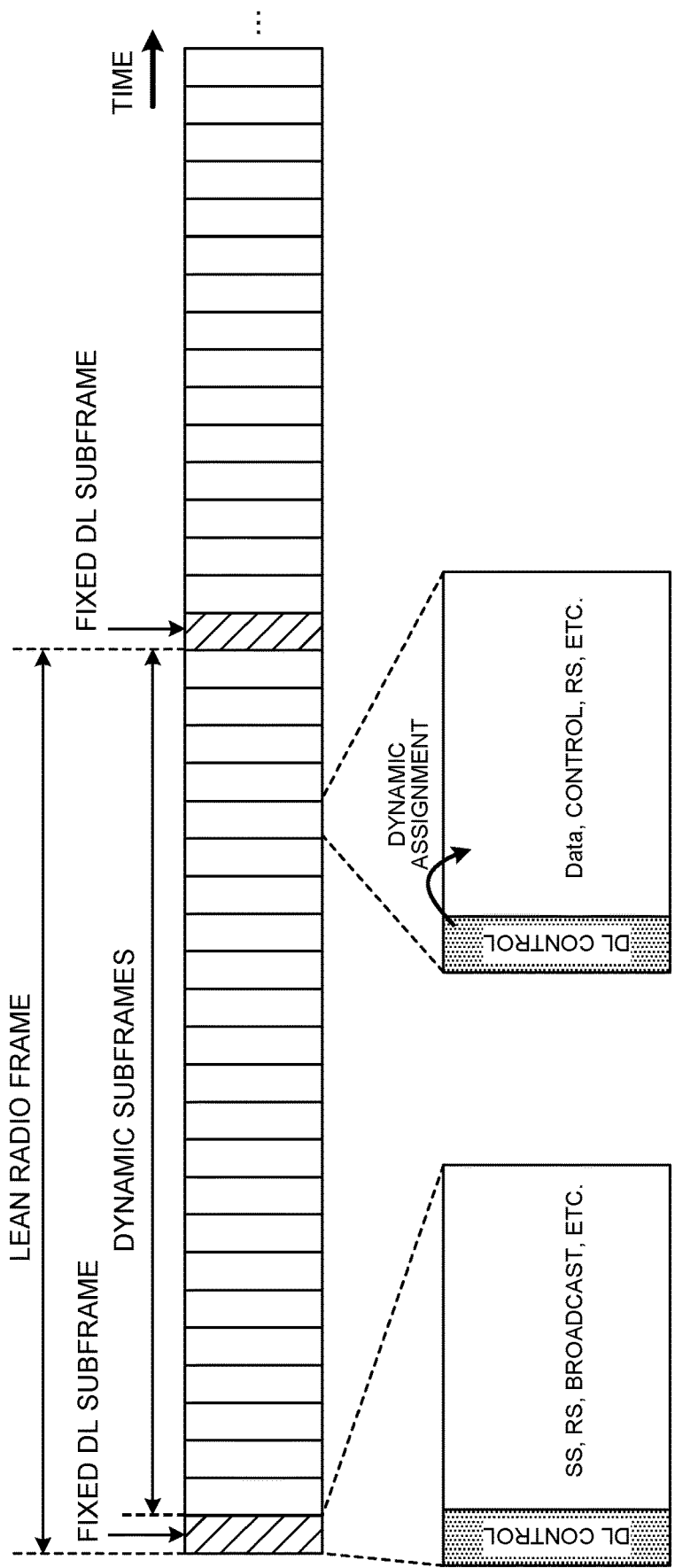
FIG. 2 is a diagram to show an example of the structure of lean radio frames.

FIG. 2 is a diagram to show examples of the structures of fixed DL subframes and dynamic subframes. Note that the structures of fixed DL subframes and dynamic subframes shown in FIG. 2 are simply examples, and those shown in FIG. 2 are by no means limiting.

As shown in FIG. 2, fixed DL subframes are used to transmit signals for cell discovery (detection), synchronization, measurements (for example, RRM (Radio Resource Management) measurements including RSRP (Reference Signal Received Power) measurements), mobility control, initial access control, and so on.

The signals to be transmitted in fixed DL subframe may be, for example, at least one of a detection signal, a detection measurement signal, a measurement signal, a mobility measurement signal, a discovery reference signal (DRS), a discovery signal (DS), synchronization signals (PSS (Primary Synchronization Signal) and/or SSS (Secondary Synchronization Signal)), a broadcast signal (broadcast information (MIB (Master Information Block) and/or system information (SIBs (System Information Blocks)) and a channel state information reference signal (CSI-RS).

Also, the signals to be transmitted in fixed DL subframes may be designated by the DL control signals of the fixed DL subframes, may be determined in advance, or may be configured via RRC signaling. If the signals to be transmitted in fixed DL subframe are designated by DL control signals, a radio base station can command a user terminal to receive DL data, DL sounding RSs and so on, in fixed DL subframes (scheduling).

Here, when DL control signals of different roles are multiplexed over the same DL control channel, for example, different IDs (RNTIs and/or the like) can be applied to the DL control signals of respective roles to mask the CRC (Cyclic Redundancy Check). In this case, in fixed DL subframes, the information to be reported in common to a plurality of user terminals (for example, a broadcast signal or a broadcast-based signal) can be scheduled, information about the subframe format of dynamic subframes (for example, information about the direction of communication in the data channel) can be reported, and DL data and the DL sounding RS can be transmitted and scheduled using resources that are left after reporting information about the position of the fixed UL subframe, and so on.

On the other hand, the dynamic subframes can be used to transmit the signals designated by the DL control signals of the dynamic subframes (or the fixed DL subframes), such as DL and/or UL (hereinafter referred to as "DL/UL") data, DL/UL sounding, feedback signals in response to uplink control information (UCI), random access preambles, and so on.

Furthermore, in the dynamic subframes, assignment may be performed so that transmission/receipt control (scheduling) is completed within the dynamic subframes, in order to enable short-time communication. This type of assignment is also referred to as "self-contained assignment." Subframes, in which self-contained assignment is performed, may be referred to as "self-containment subframes." Self-contained subframes may be referred to as "self-contained TTIs" or "self-contained symbol sets," or other names may be applied.

Furthermore, in FIG. 2, the DL control signals are time-division-multiplexed (TDM: Time Division Multiplexing) with other signals (for example, with data signals and other signals), but this is by no means limiting. The DL control signals may be time-division-multiplexed (TDM) and/or frequency-division-multiplexed (FDM: Frequency Division Multiplexing) with other signals, or may be embedded in data signals (or placed in some of the resource elements (RE) of the symbols assigned to the data signals).

Now, in existing LTE systems, DL sounding is done using predetermined subframes and reference signals that are mapped in predetermined locations (for example, resource elements). Consequently, DL sounding in existing LTE systems may lack flexibility and scalability in future radio communication systems that employ dynamic subframe utilization.

To be more specific, in existing LTE systems, radio base stations transmit cell-specific reference signals (CRSs), in each subframe, as reference signals for DL sounding, and transmit CSI-RSs in subframes of a predetermined cycle (for example, five ms or ten ms), configured by higher layer signaling. User terminals measure DL channel states using preconfigured CRSs or CRI-RSs, and report channel state information (CSI) representing the channel states, periodically or aperiodically.

Meanwhile, the user terminals transmit sounding reference signals (SRSs) in subframes of a predetermined cycle configured by higher layer signaling, or in subframes specified by DL control signals from the radio base stations, as reference signals for UL sounding. The radio base stations measure UL channel states using the SRSs. Note that, since UL channel states are measured in the radio base stations, it is not necessary to report CSI to the radio base stations.

Thus, in existing LTE systems, while UL sounding can be performed using SRSs that are transmitted dynamically (aperiodically), DL sounding has to be performed using the CRS of each subframe or by using CSI-RSs of a predetermined cycle. For this reason, it might occur that DL sounding in existing LTE systems lacks flexibility and scalability, and does not fit in future radio communication systems that employ dynamic subframe utilization.

So, the present inventors have come up with the idea of performing DL sounding using dynamically-scheduled DL sounding reference signals, to provide a sounding method that is suitable for future radio communication systems that employ dynamic subframe utilization.

Now, the radio communication method according to one embodiment of the present invention will be described below. Note that, in the present embodiment, subframes may be one ms, which is the same as in existing LTE systems, or may be shorter than one ms, longer than one ms, and so on. Furthermore, the duration of each symbol in subframes may have the same as in existing LTE systems, may be shorter than in existing LTE systems, or may be longer than in existing LTE systems. Furthermore, the number of symbols in a subframe may be the same as or different from that in existing LTE systems.

Furthermore, a subframe may be referred to as a "transmission time interval (TTI)." A subframe (one ms), if shorter than one ms, may be referred to as a "short subframe," "short TTI," and so on. Meanwhile, a subframe from existing LTE systems is also referred to as an "LTE subframe," a "normal TTI," a "long TTI," and so on.

Furthermore, the DL sounding control according to the present embodiment may be applied to the above-described dynamic subframes in lean radio frames. That is to say, subframes in the following description may refer to the above-described dynamic subframes in lean radio frames, or may be fixed DL subframes.

Furthermore, the reference signal for DL sounding (hereinafter referred to as "DL-sounding reference signal (DL-SRS)") according to the present embodiment may be any signal as long as it is a signal for use for DL sounding (the measurement of DL channel states). The DL-SRS may be referred to as "measurement reference signal (reference signal for measurement)," "measurement signal (signal for measurement)," "CSI-RS," "SRS" and so on.

First Aspect

With a first aspect of the present invention, the control of DL sounding will be described. According to the first aspect, the receipt of a DL-SRS is controlled based on downlink control information (DCI) that is contained in the same subframe as that of the DL-SRS.

To be more specific, this DCI contains information about the scheduling (assignment) of the DL-SRS in subframes (this information will be hereinafter referred to as "DL-SRS scheduling information"). User terminals control the receipt of the DL-SRS based on the DL-SRS scheduling information contained in DCI.

<DL Sounding Resources>

According to the first aspect, the time and/or frequency resource where the DL-SRS is mapped (hereinafter referred to as "DL sounding resource") may be configured through higher layer signaling (for example, RRC signaling and broadcast information), and the DL-SRS scheduling information contained in the DCI may indicate whether or not the DL-SRS is assigned in the same subframe (the presence or absence of the DL-SRS). In this case, this DL-SRS scheduling information can be, for example, one bit, so that the overhead of DCI can be reduced.

Alternatively, the DL sounding resource may be indicated by the DL-SRS scheduling information contained in the DCI. In this case, the DL sounding resource can be changed dynamically based on DCI, so that it is possible to improve the efficiency of the use of time/frequency resources.

Alternatively, multiple candidates for the DL sounding resource may be configured via higher layer signaling, and the DL-SRS scheduling information contained in the DCI may indicate a DL sounding resource that is selected from these multiple candidates. For example, when three candidates for the DL sounding resource are configured by higher layer signaling, the DL-SRS scheduling information can be made two bits. Consequently, it is possible to improve the efficiency of the use of radio resources while reducing the overhead of DCI.

Note that the above DL-SRS scheduling information may be contained in DCI only when the DL-SRS is assigned, so as to indicate that the DL-SRS is assigned, or may be contained in DCI even when the DL-SRS is not assigned, so as to indicate that the DL-SRS is not assigned.

Furthermore, the above-described DL sounding resources may be assigned at the same granularity as the time and/or frequency resources where DL data signals (DL data channel) are mapped (hereinafter referred to as "DL data resources"), or may be assigned at coarser granularity than DL data resources.

In order to reduce the overhead of DCI, DL data resources are assigned in units of resource block groups (RBGs), which are groups of at least one resource block (PRB: Physical Resource Block). RBGs are comprised of varying numbers of PRBs, depending on the number of PRBs constituting the system bandwidth. For example, one RBG is formed with one PRB when the system bandwidth is ten or fewer PRBs, one RBG is formed with two PRBs when the system bandwidth is eleven to twenty-six PRBs, one RBG is formed with three PRBs when the system bandwidth is twenty-seven to sixty-three PRBs, and one RBG is formed with four PRBs when the system bandwidth is sixty-four to 110 RBGs.

In this way, DL data resources are assigned in different units of assignment (for example, in units of predetermined numbers of PRBs) (that is, at varying granularities of assignment) depending on the system bandwidth. Likewise, DL sounding resources may be assigned in varying units of assignment (for example, in units of predetermined numbers of PRBs), depending on the system bandwidth.

In addition, the assignment unit for DL sounding resources may be the same assignment unit as that for DL data resources. For example, if DL data resources are assigned in one-PRB units (when the above system bandwidth is ten PRBs), the DL sounding resource may also be assigned in one-PRB units.

Alternately, the assignment unit of DL sounding resources may be coarser in granularity than the assignment unit of DL data resources. For example, if DL data resources are assigned in one-PRB units (in the event the above system bandwidth is ten PRBs), DL sounding resources may be assigned in six-PRB units.

FIG. 3 provide diagrams to show examples of DL sounding resources according to the first aspect. As shown in FIG. 3, DL sounding resources can be assigned to at least part of the time and/or frequency resources, except for the DCI-mapping field (hereinafter referred to as "control field") in subframes.

For example, in FIG. 3A, the DL sounding resource is assigned over a predetermined bandwidth, in all symbols in the subframe, except for the control field. In FIG. 3B and FIG. 3C, the DL sounding resource is assigned over a predetermined bandwidth, in some of the symbols in the subframe. Furthermore, in FIG. 3D, the DL sounding resource is assigned to a part of a predetermined bandwidth (for example, to a predetermined number of PRBs), in all symbols in the subframe, except for the control field. In FIG. 3E and FIG. 3F, the DL sounding resource is assigned to a part of a predetermined bandwidth (for example, to a predetermined number of PRBs), in some of the symbols in the subframe.

Note that the predetermined bandwidth in FIG. 3 may be the system band or may be the bandwidth assigned to the user terminal. Also, in FIG. 3, the control field where DCI is mapped is time-division-multiplexed with the DL-SRS, but this is by no means limiting. The control field may be frequency-division-multiplexed, or time-division-multiplexed and frequency-division-multiplexed with the DL-SRS.

<DCI>

According to the first aspect, the above-mentioned DCI to contain DL-SRS scheduling information may be (1) DCI that commands receipt of both DL data signals and the DL-SRS (that is, DCI for DL data signals—for example, DL assignment), (2) or may be DCI that commands receipt of the DL-SRS (that is DCI for the DL-SRS).

In the case of (1) above, the DL-SRS scheduling information and the DL data signal scheduling information may be joint-encoded. The overhead of DCI can be reduced by this joint-encoding. Furthermore, since existing DCI formats can be used, it is possible to reduce the load of designing new DCI formats.

In the above case of (2), the user terminal blind-decodes the DCI for DL data signals and the DCI for the DL-SRS separately. In this way, when DCI for the DL-SRS is provided apart from the DCI for DL data signals, DL sounding resources can be assigned more flexibly. Also, even when one of the DCIs fails to be received, there is still a possibility that the other DCI can be received, so that it is possible to exert control so that whether or not the DL-SRS is scheduled has no impact on the received quality of the DCI that commands receipt of DL data signals.

FIG. 4 provide diagrams to show examples of the configuration of the number of times blind decoding is performed, according to the first aspect. In existing LTE systems, the number of times blind decoding is performed on the DCI for DL data signals (hereinafter referred to as "the number of blind decodings") is determined based on the aggregation level of control channel elements (CCEs) constituting DL control signals (DL control channel, L1/L2 control channel, etc.). To be more specific, at aggregation levels 1, 2, 4 and 8, the number of blind decodings on the DCI for DL data signals is configured to 6, 6, 2 and 2, respectively.

When the DCI for the DL-SRS is provided apart from the DCI for DL data signals, as shown in FIG. 4A, the total number of blind decodings may increase in proportion to the DCI for the DL-SRS. For example, in FIG. 4A, at aggregation levels 1, 2, 4, and 8, the number of blind decodings on the DCI for DL data signals is configured as in existing LTE systems, and the number of blind decodings on the DCI for the DL-SRS is configured to 2, 2, 1 and 1, respectively.

On the other hand, as shown in FIG. 4B, the total number of blind decodings may be the same as in existing LTE systems. For example, in FIG. 4B, at aggregation levels 1, 2, 4, and 8, the number of blind decodings on the DCI for DL data signals is configured to 4, 4, 1 and 1, respectively, and the number of blind decodings on the DCI for the DL-SRS is configured to 2, 2, 1 and 1, respectively.

<DL-SRSs of Multiple Antenna Ports>

According to the first aspect, a plurality of DL-SRSs, associated with a plurality of antenna ports, respectively, may be multiplexed in the same subframe. The user terminal may control the receipt of these multiple DL-SRSs based on a single DCI, or control the receipt of the DL-SRS of each associated antenna port based on the DCI of every antenna port.

Here, an antenna port can be defined as a virtual antenna terminal, to which channels and signals that pass through the same transmission path are mapped. In the case of multi-input multi-output (MIMO), for example, if the number of data transmission layers is four, reference signals (RSs) with different antenna port numbers are respectively mapped to these four layers and transmitted. On the receiving side, it is possible to perform channel estimation for each of the four layers using the RSs carrying four different antenna port numbers, and demodulate the received data using the result of channel estimation obtained from each layer. Thus, an antenna terminal that can be regarded as having the same traveling transmission path can be defined as a virtual antenna port. Note that, when beam forming is employed, an antenna port may be referred to as a "beam index" and so on.

FIG. 5 provide diagrams to show examples of multiplexing a plurality of DL-SRSs according to the first aspect. In the description below, antenna ports #x, #y and #z will be shown as examples, but the number of antenna ports is not limited to three, and may be two or less, or four or more.

Figure 5A:
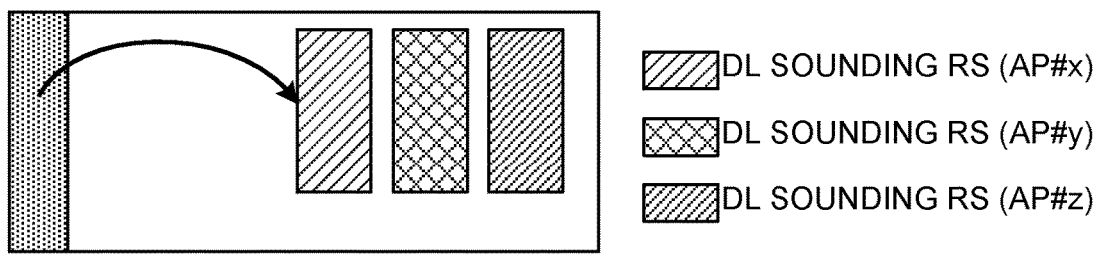
FIG. 5A to FIG. 5C provide diagrams to show examples of multiplexing a plurality of DL-SRSs according to the first aspect.
Figure 5B:
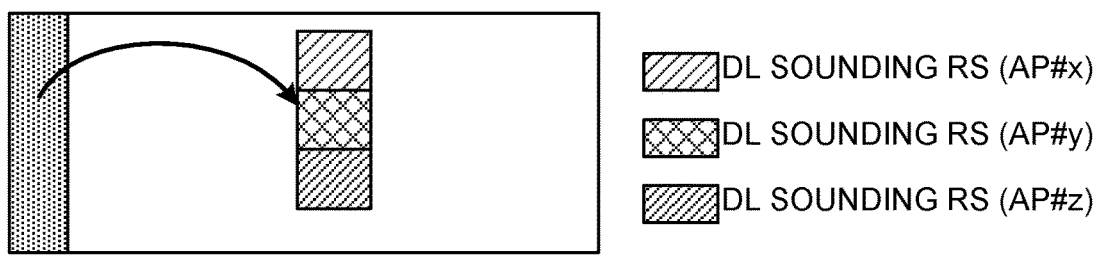
Figure 5C:
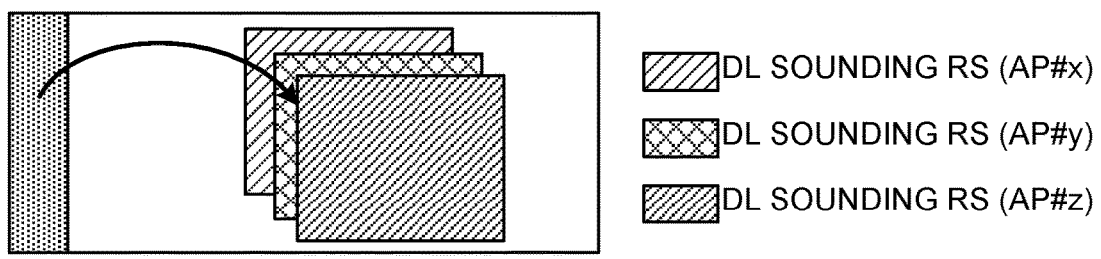

As shown in FIG. 5A to FIG. 5C, the DL-SRSs associated with antenna ports #x, #y and #z, respectively, may be time-division-multiplexed (TDM: Time Division Multiplexing) in the same subframe as shown in FIG. 5A, frequency-division-multiplexed (FDM: Frequency Division Multiplexing) as shown in FIG. 5B, code-division-multiplexed (CDM: Code Division Multiplexing) or space-division-multiplexed (SDM: Space Division Multiplexing) as shown in FIG. 5C, or multiplexed by combining at least two of these.

FIG. 6 provide diagrams to show examples of DCI according to the first aspect. Although FIG. 6 show cases where a plurality of DL-SRSs of different antenna ports are multiplexed by CDM or SDM, as mentioned earlier, the method of multiplexing a plurality of DL-SRSs is not limited to these.

Figure 6A:
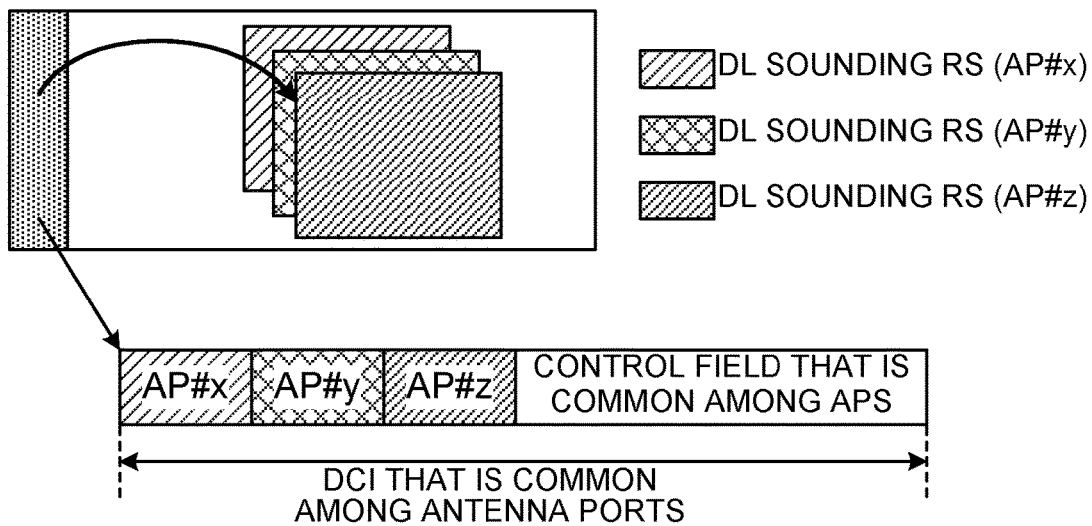
FIG. 6A and FIG. 6B provide diagrams to show examples of DCI according to the first aspect.

As shown in FIG. 6A, when a single DCI commands receipt of a plurality of DL-SRSs, this DCI may contain the DL-SRS scheduling information for each of antenna ports #x, #y and #z (for example, information to indicate the presence or absence of DL sounding resource and/or DL-SRS), control information that is common among antenna ports #x, #y and #z (for example, information about the scrambling IDs for generating DL-SRS sequences, information about transmission points (TPs) and so on), and a CRC bit field that is masked using a predetermined RNTI.

In FIG. 6A, the DL-SRS scheduling information of each antenna port and control information that applies common to the antenna ports may be joint-encoded. When a single DCI is used, common control information can be put together among the antenna ports, one CRC bit field can be added to the whole, and the DL-SRS scheduling information of each antenna port can be joint-encoded, so that the overhead of DCI can be reduced.

Figure 6B:
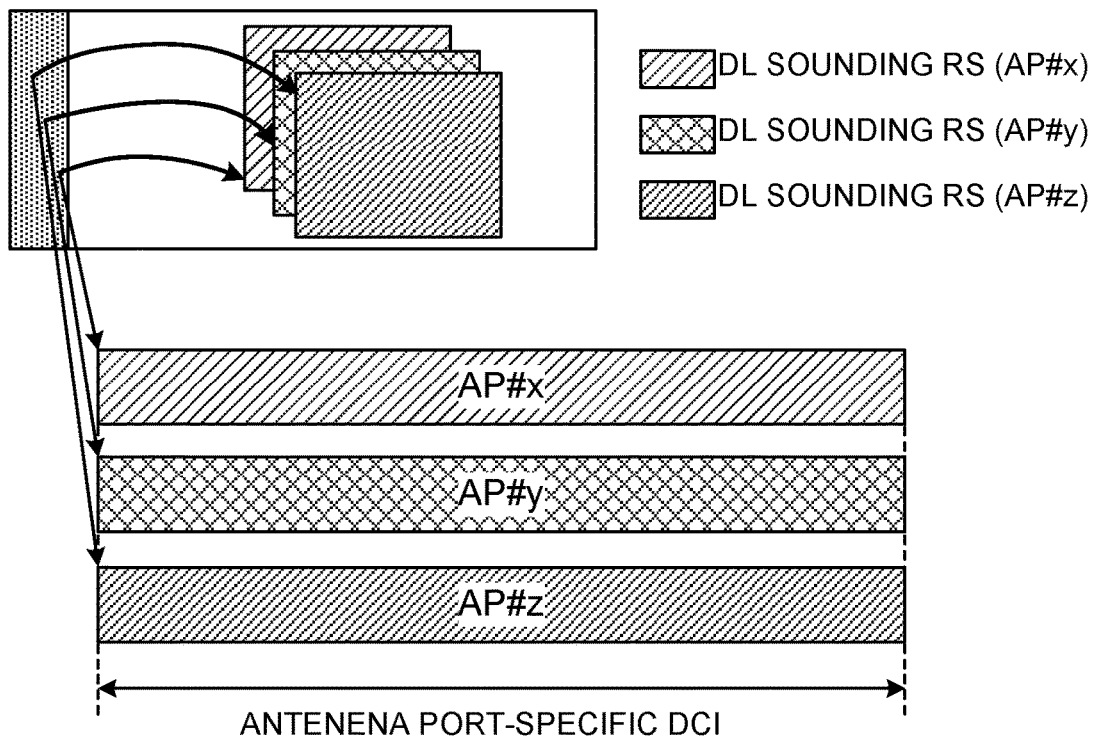

Meanwhile, when, as shown in FIG. 6B, the receipt of DL-SRSs, associated with individual antenna ports, is commanded by the DCI for each antenna port, each DCI contains the DL-SRS scheduling information (for example, information to indicate the presence or absence of DL sounding resource and/or DL-SRS) for the associated antenna port.

In FIG. 6B, the DL-SRS scheduling information of each antenna port is encoded separately and included in different DCIs. Therefore, it is possible to, for example, assign different DL sounding resources on a per antenna port basis, so that the resource control for each antenna port can be facilitated. Also, even when the user terminal fails to receive one DCI, the user terminal can still receive and decode other DCIs, so that it is possible to perform DL-SRS-based measurements in a reliable manner.

Note that each antenna port's DCI may be transmitted using a beam with the same beam index as the associated DL-SRS. In FIG. 6A and FIG. 6B, receipt of the DL-SRSs of all antenna ports (#x, #y and #z) is commanded by a single DCI or by the DCI of every antenna port, but this is by no means limiting. In FIG. 6A and FIG. 6B, receipt of the DL-SRSs of part of the antenna ports (for example, receipt of the DL-SRS of antenna port #y alone) may be commanded.

As described above, according to the first aspect of the present invention, DL-SRSs (or the DL-SRS of at least one antenna port) are scheduled dynamically based on the DCIs in the same subframe, so that it is possible to reserve the flexibility and scalability of DL sounding. It then follows that DL sounding can be performed adequately in future radio communication systems where dynamic subframe utilization is employed.

Second Aspect

Based on a second aspect of the present invention, feedback (reporting) control for CSIs, which are generated using DL-SRSs such as described above, will be described. CSIs to represent DL channel states, measured in the user terminal by using DL-SRSs, need to be fed back to the radio base station in an early stage.

In existing LTE systems, the user terminal can feed back CSI based on the value of the CSI request field that is contained in DCI (aperiodic CSI reporting). Meanwhile, with this aperiodic CSI reporting, CSI can be fed back only four or more subframes after the above DCI. In order to reduce the latency, it is desirable if CSI can be reported at an earlier timing than in existing LTE systems.

In the second aspect, feedback (reporting) of CSI that is generated using a DL-SRS may be commanded (scheduled) by the DCI of this DL-SRS, or, putting this DCI for the DL-SRS aside, may be commanded by another DCI for CSI feedback. The user terminal controls CSI feedback using UL data signals (UL data channel) or UL control signals (UL control channel) based on CSI request information that is contained in the DCI for DL sounding or CSI feedback.

Here, the CSI request information refers to information that relates to CSI feedback, and may indicate, for example, whether or not CSI feedback is requested, in which antenna port (CSI process) CSI feedback is requested, the time and/or frequency resources for use for CSI feedback (hereinafter referred to as "CSI feedback resources"), and so on.

<DCI>

FIG. 7 and FIG. 8 are diagrams to show examples of CSI feedback control according to the second aspect. Note that, although examples will be described below with reference to FIG. 7 and FIG. 8 where the DL sounding resource is assigned in the same bandwidth as the control field in all symbols in subframes except for the control field, as has been described with FIG. 3, examples of DL sounding resource assignment are by no means limited to these.

FIG. 7 show examples of CSI feedback control using DCI for the DL-SRS. In FIG. 7, the DCI for the DL-SRS includes both the DL-SRS scheduling information and the CSI request information, which have been described earlier. In the description below, the DCI for the DL-SRS can be either DCI for DL data, containing DL-SRS scheduling information, or DCI for the DL-SRS, provided apart from the DCI for DL data.

Figure 7A:
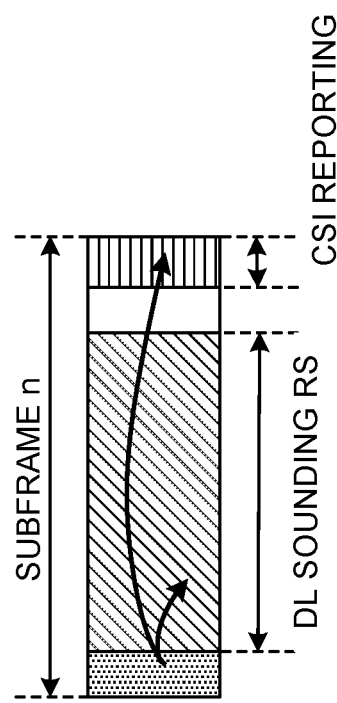
FIG. 7A and FIG. 7B are diagrams to show examples of CSI feedback control according to a second aspect of the present invention.
Figure 7B:
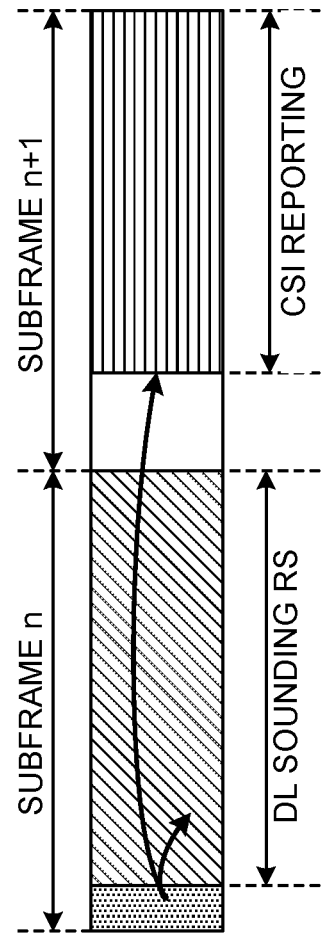

In FIG. 7A and FIG. 7B, the user terminal receives the DL-SRS based on the DL-SRS scheduling information contained in the DCI for the DL-SRS, and generates CSI by using the DL-SRS. Based on the CSI request information contained in the DCI for the DL-SRS, the user terminal transmits the above CSI in subframe n+k (k≥0), after subframe n in which the DCI and the DL-SRS are contained.

For example, as shown in FIG. 7A, the user terminal may transmit the CSI in subframe n (self-contained subframe) (k=0), in which the DCI and the DL-SRS are contained. Alternatively, as shown in FIG. 7B, the user terminal may transmit the CSI in next subframe n+1 (k=1) of subframe n.

As shown in FIG. 7A and FIG. 7B, when receipt of a DL-SRS and transmission of CSI that is generated using this DL-SRS are commanded by the same DCI, the radio base station can assume that the CSI is generated using the DL-SRS indicated by the same DCI. Consequently, the user terminal does not need to transmit, to the radio base station, information that indicates which DL-SRS has been used to measure the CSI, so that it is possible to reduce the overhead associated with CSI reporting.

FIG. 8 show examples of CSI feedback control using DCI for CSI feedback, which is provided apart from the DCI for the DL-SRS. In FIG. 8, the DCI for the DL-SRS contains the above-described DL-SRS scheduling information, and the DCI for CSI feedback contains the above-described CSI request information.

Figure 8A:
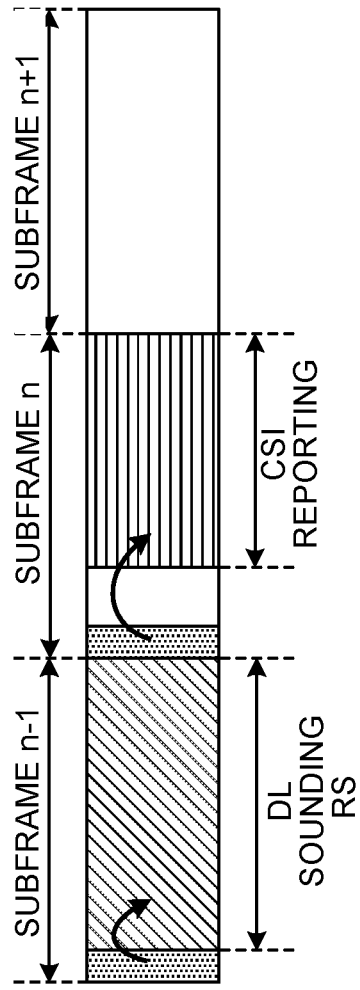
FIG. 8A and FIG. 8B are diagrams to show examples of CSI feedback control according to the second aspect.
Figure 8B:
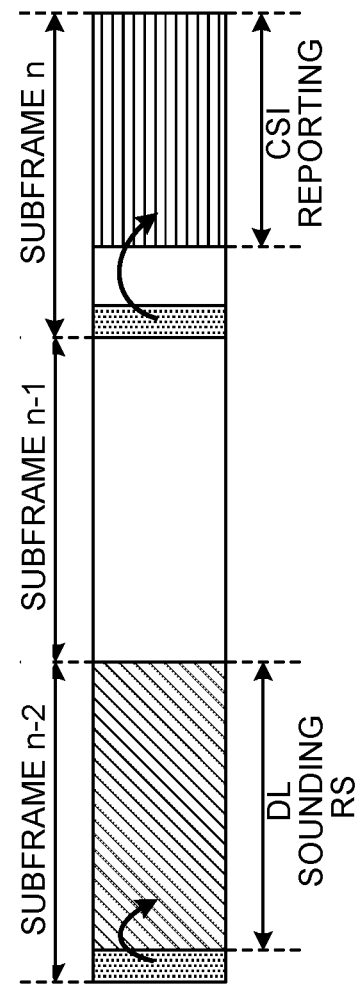

Referring to FIG. 8A and FIG. 8B, the user terminal receives the DL-SRS based on the DL-SRS scheduling information contained in the DCI for the DL-SRS, and generates CSI by using the DL-SRS. Based on the CSI request information contained in the DCI for CSI feedback, the user terminal transmits the CSI in subframe n+k (k≥0), after subframe n in which the DCI is contained.

For example, as shown in FIG. 8A, the radio base station may transmit the DCI for CSI feedback in next subframe n of subframe n−1 in which the DCI for the DL-SRS is contained. The user terminal transmits the CSI based on the CSI request information contained in the DCI for CSI feedback in this subframe n (k=0). In this case, the user terminal may transmit information that indicates that this CSI has been measured using the DL-SRS received in subframe n−1.

Alternatively, as shown in FIG. 8B, the radio base station may transmit the DCI for CSI feedback in subframe n, which is two subframes after subframe n−2 containing the DCI for the DL-SRS. The user terminal transmits the CSI based on the CSI request information contained in the DCI for CSI feedback in this subframe n (k=0). In this case, the user terminal may transmit information to indicate that the CSI has been measured using the DL-SRS received in subframe n−2.

As shown in FIG. 8A and FIG. 8B, when receipt of a DL-SRS and transmission of CSI that is generated using this DL-SRS are commanded by separate DCIs, more flexible CSI reporting is possible. For example, although not illustrated in the drawings, if DCI for CSI feedback is received in subframe n, the CSIs that are generated in subframes n−2 and n−1 individually can be transmitted collectively in subframe n.

In the event receipt of a DL-SRS and transmission of the CSI that is generated using this DL-SRS are commanded by separate DCIs contained in the same DL control channel, the total number of blind decodings may be increased by the amount of DCI for CSI feedback, or the number of blind decodings for each DCI may be decreased without changing the total number of blind decodings.

<CSIs of Multiple Antenna Ports>

As has been described with reference to the first aspect, a plurality of DL-SRSs, associated with a plurality of antenna ports, respectively, may be multiplexed in the same subframe. Now, control of CSI feedback for a plurality of antenna ports will be described. To be more specific, (1) the case where receipt of these multiple DL-SRSs and transmission of at least one antenna port's CSI are commanded using the same DCI, and (2) the case where receipt of these multiple DL-SRSs and transmission of at least one antenna port's CSI are commanded using different DCIs will be described.

(1) When the Same DCI is Used

Figure 9:
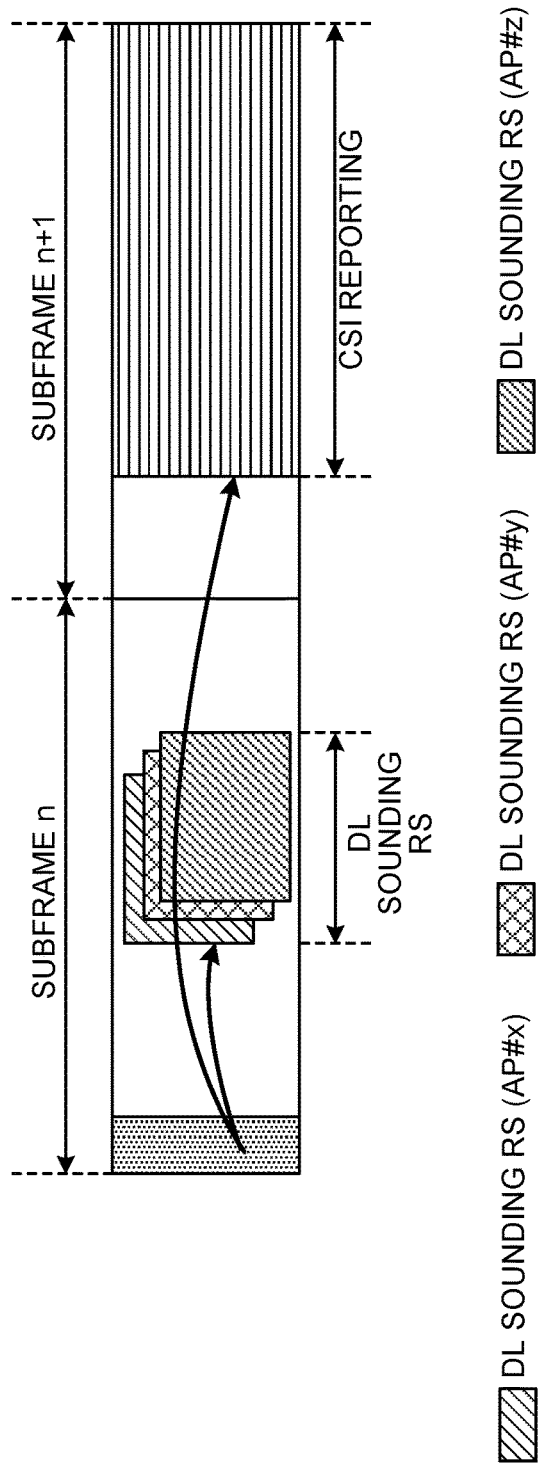
FIG. 9 is a diagram to show an example of CSI feedback control according to the second aspect.

FIG. 9 is a diagram to show an example of CSI feedback control according to the second aspect. FIG. 9 shows the case where the DCI received in subframe n commands receipt of a plurality of DL-SRSs, associated with antenna ports #x, #y and #z, respectively, and transmission of CSIs for a plurality of antenna ports, generated using these multiple DL-SRSs.

In the case shown in FIG. 9, the transmission of the CSIs of antenna ports #x, #y and #z, using UL data signals (UL data channel) or UL control signals (UL control channel), are controlled based on the CSI request information contained in the above DCI. For example, in FIG. 9, the user terminal transmits the CSIs for antenna ports #x, #y and #z in subframe n+1. The CSIs of antenna ports #x, #y and #z may be joint-encoded or may be encoded separately.

As shown in FIG. 9, when receipt of a plurality of DL-SRSs and transmission of a plurality of CSIs generated using these multiple DL-SRSs are commanded by the same DCI, the radio base station can assume that these multiple CSIs are generated using a plurality of DL-SRSs indicated by the same DCI. For this reason, the user terminal does not need to transmit, to the radio base station, information that indicates which DL-SRS has been used to measure the CSI, so that the overhead associated with CSI feedback can be reduced.

Figure 10A:
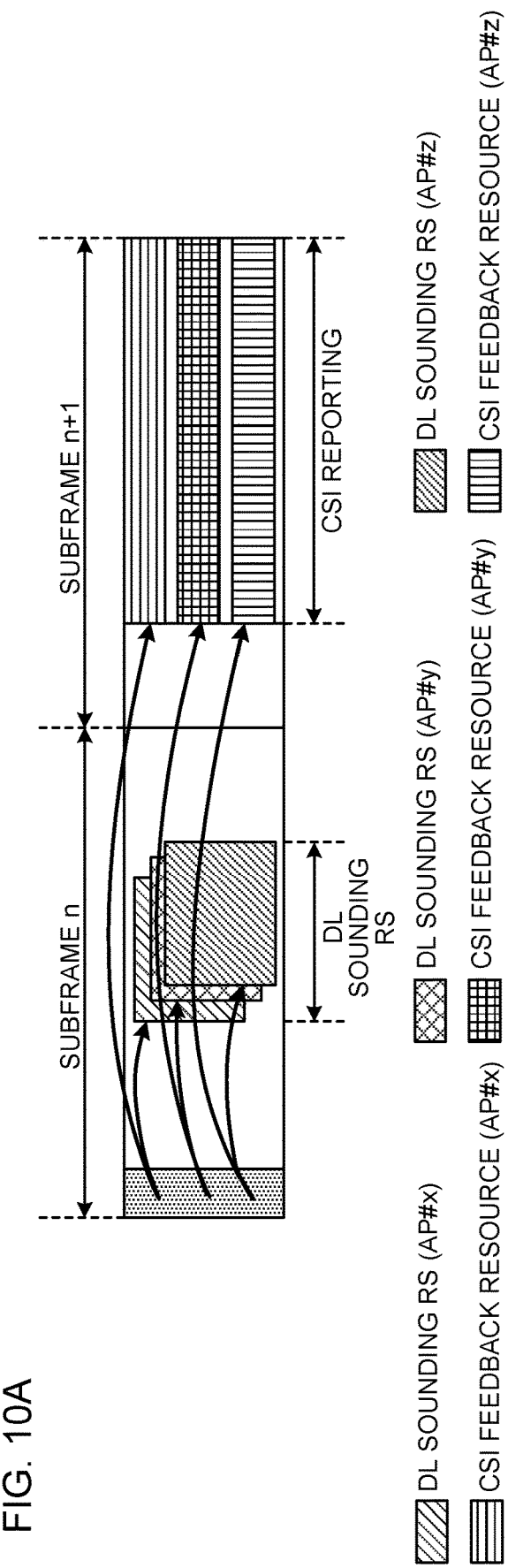
FIG. 10A and FIG. 10B are diagrams to show examples of CSI feedback control according to the second aspect.

FIG. 10 provide diagrams to show examples of CSI feedback control according to the second aspect. FIG. 10A shows the case where the DCI of every antenna port commands receipt of the DL-SRS of each antenna port and indicates the CSI feedback resource for each antenna port.

Referring to FIG. 10A, DL-SRS scheduling information for antenna ports #x, #y, and #z and CSI request information that indicates the CSI feedback resources for antenna ports #x, #y and #z are contained in the DCIs for antenna ports #x, #y and #z. The user terminal measures the CSIs of antenna ports #x, #y and #z, individually, based on the DL-SRS scheduling information of antenna ports #x, #y and #z, and encodes these CSIs separately. The user terminal transmits the CSIs of antenna ports #x, #y, and #z, encoded separately, by using different CSI feedback resources #x, #y, and #z.

Figure 10B:
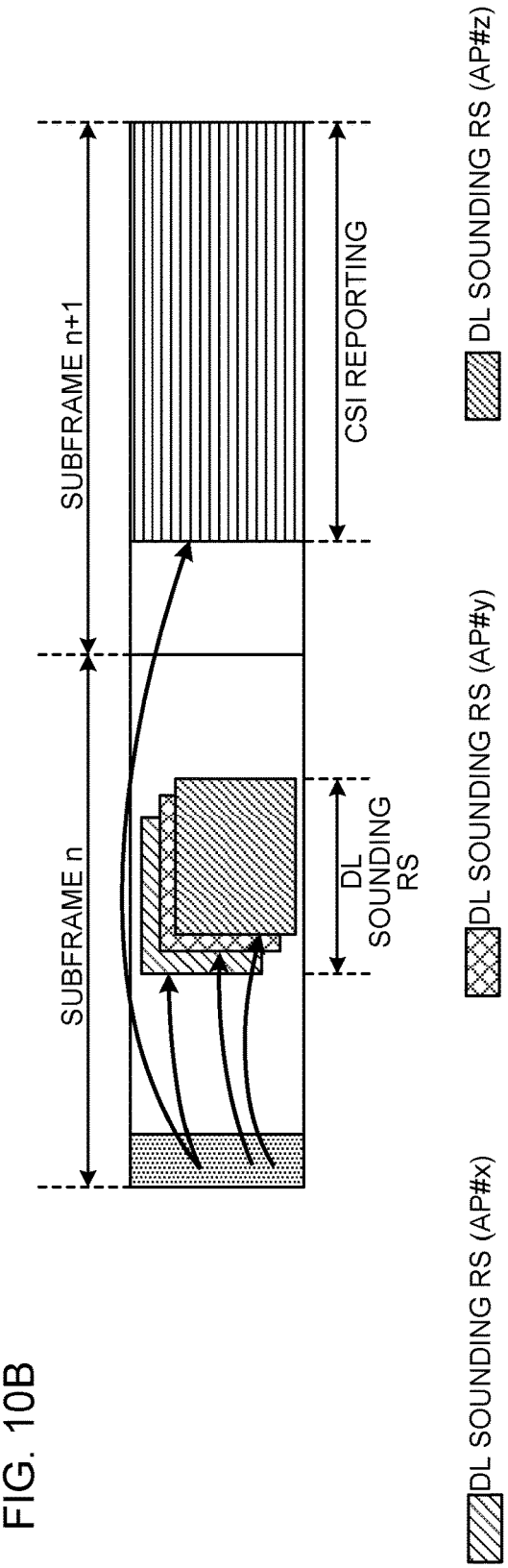

On the other hand, FIG. 10B shows the case where the DCI for one antenna port commands transmission of at least one antenna port's CSI. In FIG. 10B, the DCIs for antenna ports #x and #z contain DL-SRS scheduling information for antenna ports #x and #z. Meanwhile, the DCI for antenna port #y contains DL-SRS scheduling information for antenna port #y and CSI request information to indicate the CSI feedback resource.

In FIG. 10B, the user terminal measures the CSIs of antenna ports #x, #y and #z, individually, based on the DL-SRS scheduling information of antenna ports #x, #y and #z. The user terminal transmits the CSI of at least one of antenna ports #x, #y and #z, using the CSI feedback resource indicated by the DCI for antenna port #x.

Here, the DCI to specify the CSI feedback resource (the DCI for antenna port #x in FIG. 10B) may be determined in advance, or may be configured via higher layer signaling. For example, the DCI to indicate the CSI feedback resource may be DCI that commands receipt of the DL-SRS of the antenna port with the lowest antenna port number.

Also, the payload may be different between the DCI that specifies the CSI feedback resource (the DCI for antenna port #x in FIG. 10B) and DCI that does not specify the CSI feedback resource (the DCIs for antenna ports #y and #z in FIG. 10B).

In addition, using the above CSI feedback resource, the user terminal may transmit the CSIs of antenna ports (here, #x, #y and #z) configured by higher layer signaling (semi-static CSI codebook determination), or transmit the CSI of the antenna port designated by this DCI (dynamic CSI codebook adaptation).

In semi-static CSI codebook determination, regardless of whether the DCI for each antenna port and the DL-SRS of the antenna port indicated by the DCI are received, the user terminal may transmit the CSIs of all antenna ports configured by higher layer signaling. This is because, if only those CSIs associated with antenna ports from which DCI has been received (detected) successfully are transmitted, there will be a gap in the recognition of the CSI codebook (the number of CSIs that are fed back) between the user terminal and the radio base station.

For example, assuming the case where the user terminal fails to receive the DCI for antenna port #z among the individual DCIs of antenna ports #x, #y and #z, the user terminal can measure the CSIs of antenna ports #x and #y, from which the user terminal has received DCIs successfully, but cannot measure the CSI of antenna port #z, where the user terminal has failed to receive the DCI. In this case, the user terminal includes not only the CSIs of antenna ports #x and #y but also the CSI of antenna port #z (by joint-encoding the CSIs of antenna ports #x, #y and #z), in uplink control information (UCI), and transmits this to the radio base station. At this time, since there is no result measured based on the DL-SRS of antenna port #z, whose DCI has failed to be received, the lowest CSI value (for example, "out of range (OOR)" or CSI index #0) may be reported as the CSI measurement result for this antenna port. In this way, the user terminal and the radio base station can share a common recognition of the CSI codebook.

On the other hand, in dynamic CSI codebook adaptation, the radio base station may indicate to the user terminal, with DCI, which CSIs, including which antenna ports' DL-SRSs have been used to measure these CSIs, should be reported. For example, the DCI to specify the CSI feedback resource (the DCI for antenna port #x in FIG. 10B) contains information to indicate which CSIs, including which antenna ports' DL-SRSs have been used to measure the CSIs, should be reported.

In this case, regardless of whether or the DCI of an antenna port designated by the radio base station is received, the user terminal transmits the CSI of this antenna port to the radio base station. In this way, the user terminal and the radio base station can share a common recognition of the CSI codebook.

Alternatively, in dynamic CSI codebook adaptation, the user terminal may report to the radio base station which CSIs, including which antenna ports' DL-SRSs have been used to measure the CSIs, are reported. For example, if the user terminal fails to receive the DCI for antenna port #z among the individual DCIs of antenna ports #x, #y and #z, the user terminal transmits, to the radio base station, the CSIs of antenna ports #x and #y, from which the user terminal has received DCIs successfully, and information to indicate that the CSIs of antenna ports #x and #y are reported. Note that these CSIs and the information may be separately encoded (separate encoding).

In this case, even if the user terminal transmits, to the radio base station, only those CSIs that have been measured using the DL-SRSs of antenna ports whose DCIs have been received successfully, the user terminal and the radio base station can share a common recognition of the CSI codebook. Therefore, the accuracy of CSIs that are transmitted to the radio base station can be improved.

(2) When Different DCIs are Used

Figure 11:
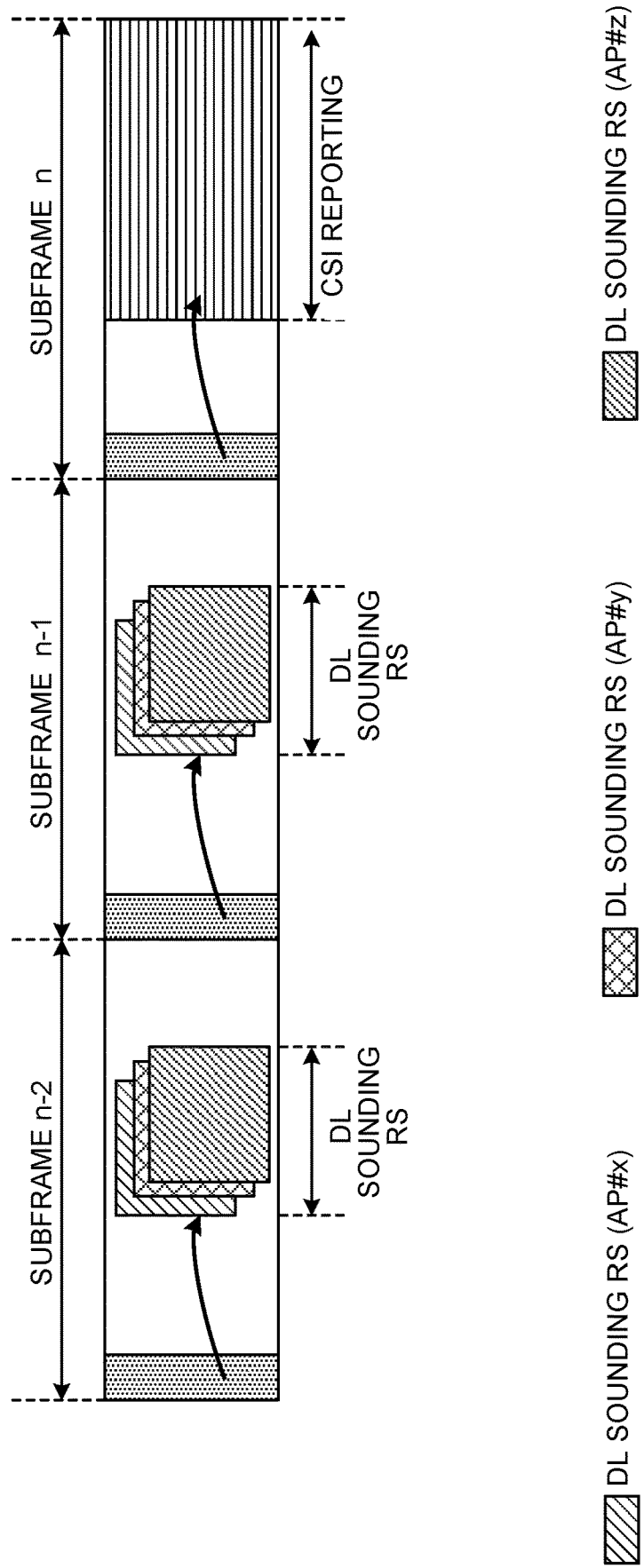
FIG. 11 is a diagram to show an example of CSI feedback control according to the second aspect.

FIG. 11 is a diagram to show an example of CSI feedback control according to the second aspect. FIG. 11 shows a case where receipt of a plurality of DL-SRSs, associated with a plurality of antenna ports, respectively, and transmission of the CSI of at least one of these multiple DL-SRSs are commanded by different DCIs.

In the case shown in FIG. 11, the user terminal receives the DL-SRSs of antenna ports #x, #y and #z based on the DCIs received in each of subframes n−2 and n−1, and generates the CSI of antenna ports #x, #y, and #z.

Furthermore, based on the CSI request information contained in the DCI received in subframe n, the user terminal controls the transmission of the CSI of at least one of antenna ports #x, #y and #z using UL data signals (UL data channel) or UL control signals (UL control channel). This CSI request information may indicate CSI feedback resource.

Also, in subframe n, the user terminal may transmit the CSIs of antenna ports (here, #x, #y and #z) configured by higher layer signaling, in accordance with the above-described semi-static CSI codebook determination, or the user terminal may transmit the CSIs of those antenna ports specified by the CSI request information in DCI, in accordance with the dynamic CSI codebook adaptation described above.

In semi-static CSI codebook determination, the user terminal may transmit the CSIs of all time and/or frequency resources (for example, subframes, component carriers, access points, etc.) that are configured by higher layer signaling for use for DL-SRSs.

Also, in dynamic CSI codebook adaptation, the user terminal may transmit the CSIs of time and/or frequency resources (for example, subframes, component carriers, access points, etc.) that are specified by DCIs from the radio base station. Alternatively, the user terminal may report to the radio base station for which time and/or frequency resources (for example, subframes, component carriers, access points, etc.) CSIs are reported.

As described above, according to the second aspect of the present invention, feedback of CSIs that are generated using DL-SRSs (or the DL-SRS of at least one antenna port) is dynamically controlled by the DCIs of the same or different DL-SRSs. Therefore, in future radio communication systems that employ dynamic subframe utilization, CSIs that are measured using DL-SRSs can be fed back to the radio base station in a more flexible manner.

(Radio Communication System)

Now, the structure of a radio communication system according to an embodiment of the present invention will be described below. In this radio communication system, communication is performed using one or a combination of the radio communication methods according to the above aspects of the present invention.

Figure 12:
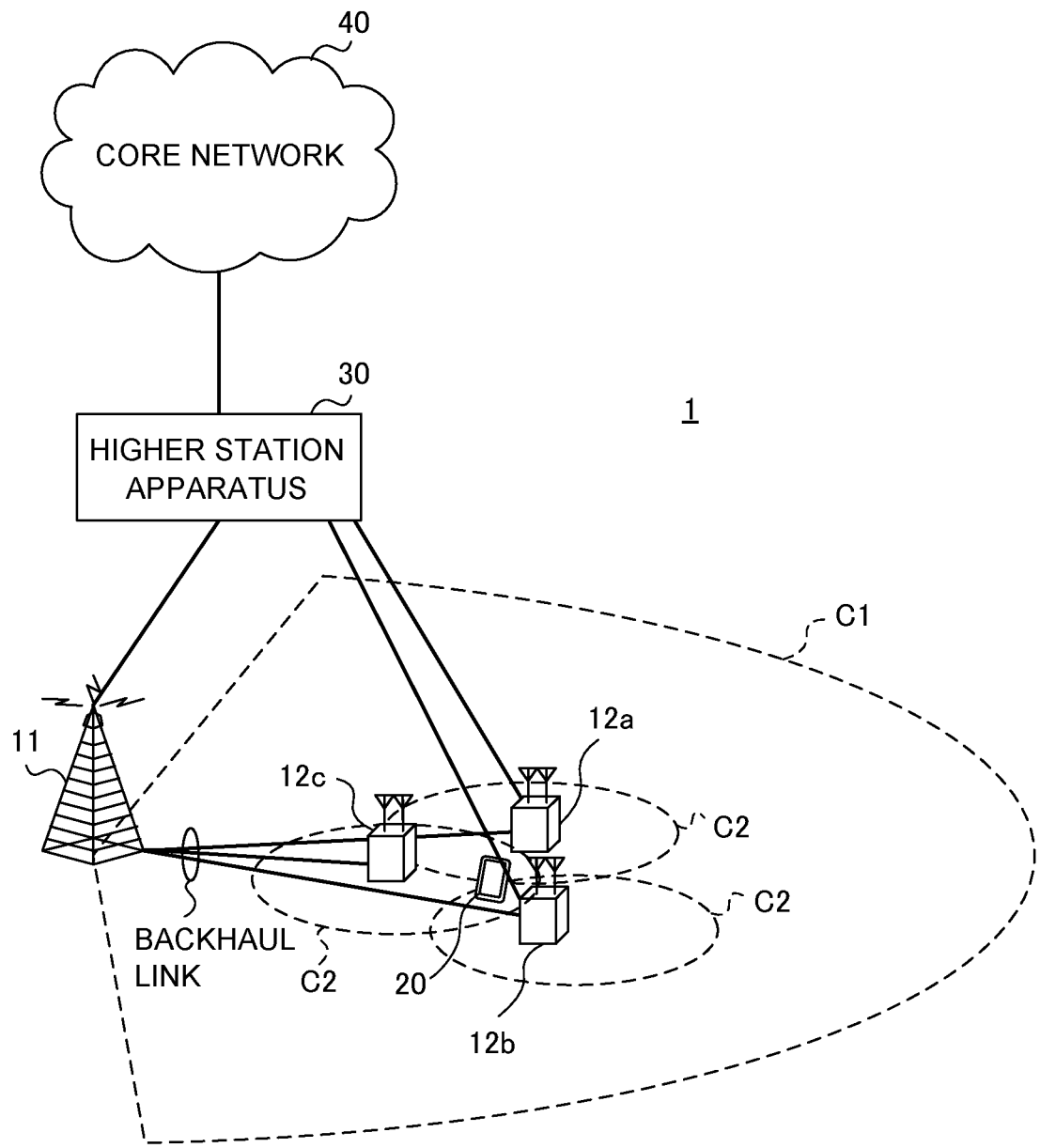
FIG. 12 is a diagram to show an example of a schematic structure of a radio communication system according to the present embodiment.

FIG. 12 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 shown in FIG. 12 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. Delivery acknowledgment information (also referred to as, for example, "retransmission control information," "HARQ-ACKs," "ACK/NACKs," etc.) of HARQ (Hybrid Automatic Repeat reQuest) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS) and so on are communicated as DL reference signals. Also, in the radio communication system 1, the measurement reference signal (SRS: Sounding Reference Signal), the demodulation reference signal (DMRS) and so on are communicated as UL reference signals. Note that the DMRS may be referred to as a "user terminal-specific reference signal (UE-specific Reference Signal)." Also, the reference signals to be communicated are by no means limited to these.

<Radio Base Station>

Figure 13:
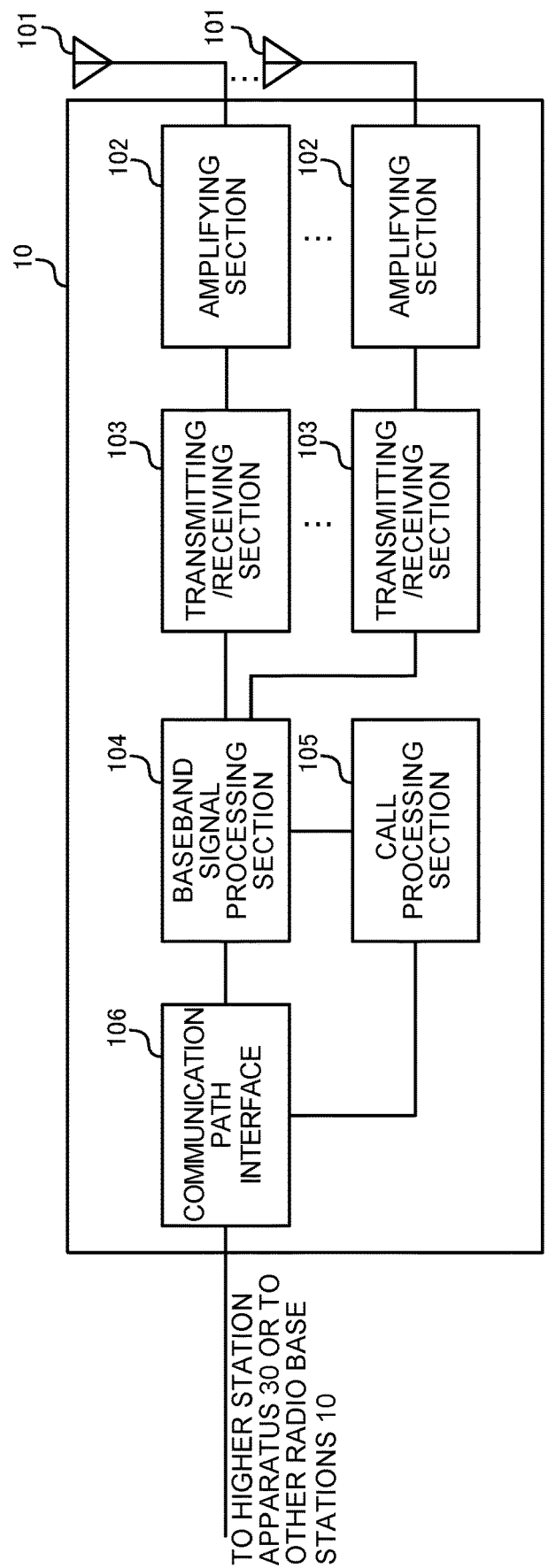
FIG. 13 is a diagram to show an example of an overall structure of a radio base station according to the present embodiment.

FIG. 13 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 through DL is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals, DL data signals, DL reference signals, discovery signals, synchronization signals, broadcast signals, DL-SRSs, etc.) and receive UL signals (for example, UL control signals, UL data signals, UL reference signals, random access preambles, UL-SRSs, etc.).

To be more specific, the transmitting/receiving sections 103 transmit a DL-SRS following a command from the control section 301 (first aspect). In addition, in the same subframe as that of this DL-SRS, the transmitting/receiving sections 103 transmit DCI that commands receipt of this DL-SRS. Furthermore, the transmitting/receiving sections 103 may transmit a plurality of DL-SRSs that are associated with a plurality of antenna ports, respectively. Furthermore, in the same subframe as that of the multiple DL-SRSs, the transmitting/receiving sections 103 may transmit DCI that commands receipt of the multiple DL-SRSs, or transmit DCI that command receipt of the DL-SRS, on a per antenna port basis.

Furthermore, the transmitting/receiving sections 103 receive CSIs that are generated using the above-described DL-SRSs (second aspect). Furthermore, the transmitting/receiving section 103 may transmit DCI that commands transmission of these CSIs. Also, the transmitting/receiving section 103 may receive the CSI of at least one antenna port. In addition, the transmitting/receiving section 103 may send DCI that commands transmission of at least one antenna port's CSI.

Figure 14:
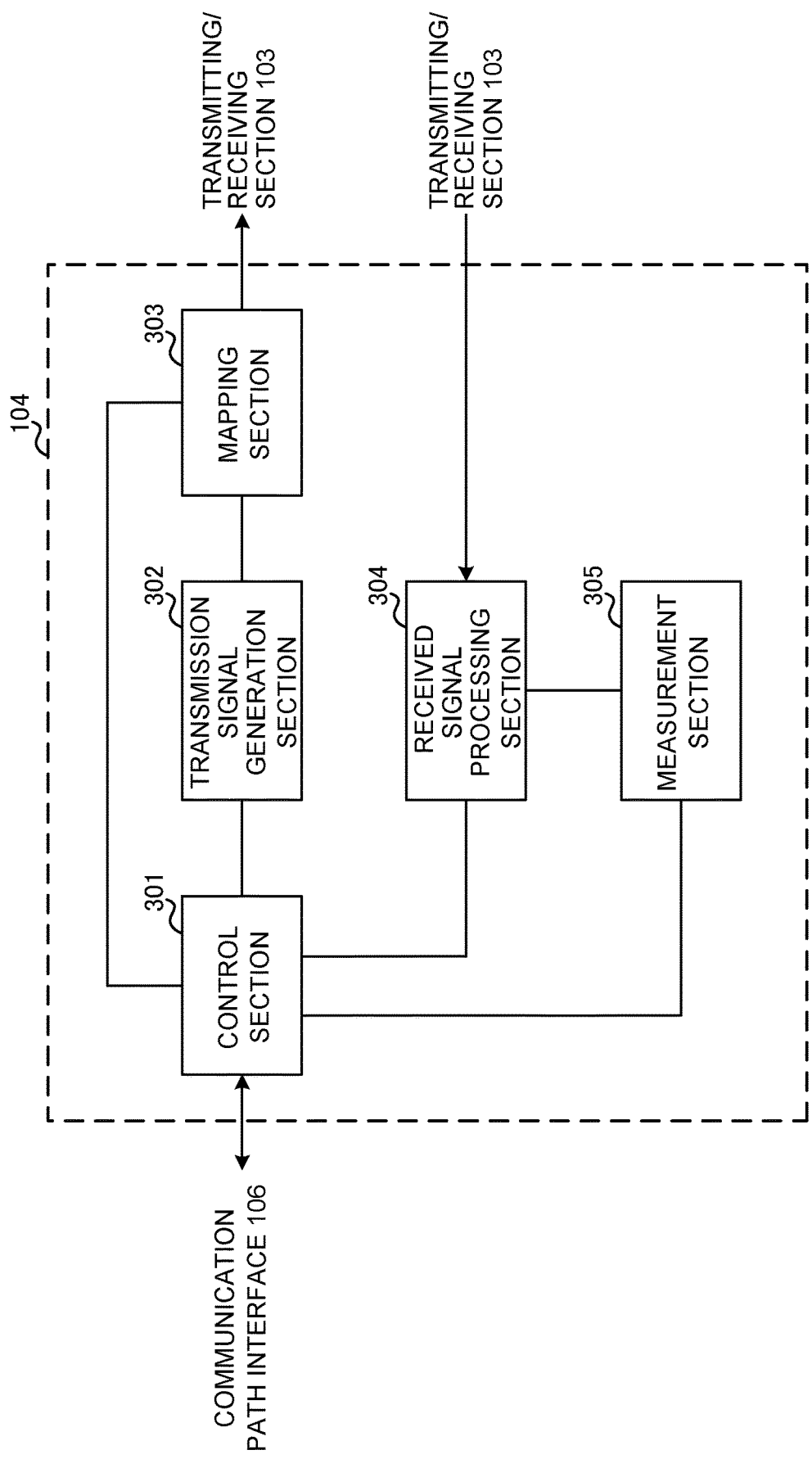
FIG. 14 is a diagram to show an example of a functional structure of a radio base station according to the present embodiment.

FIG. 14 is a diagram to show an example of a functional structure of a radio base station according to the present embodiment. Note that, although FIG. 14 primarily shows functional blocks that pertain to characteristic parts of the present embodiment, the radio base station 10 has other functional blocks that are necessary for radio communication as well. As shown in FIG. 14, the baseband signal processing section 104 has a control section (scheduler) 301, a transmission signal generation section 302, a mapping section 303, a received signal processing section 304 and a measurement section 305.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. For example, the control section 301 may schedule DL signals (for example, discovery signals, synchronization signals, broadcast signals, and so on) and/or UL signals (for example, random access preambles, and so on) that are configured in advance in fixed subframes (see FIG. 1 and FIG. 2). In addition, the control section 301 may schedule DL signals (for example, DL-SRSs, DL data signals, and so on) and/or UL signals (for example, UL-SRSs, UL data signals, and so on) in dynamic subframes (see FIG. 1 and FIG. 2).

To be more specific, the control section 301 may schedule DL-SRSs (or the DL-SRS of at least one antenna port) by using the DCI transmitted in the same subframe as that of the DL-SRSs. For example, the control section 301 determines whether or not to transmit a DL-SRS, which DL sounding resource this DL-SRS is mapped, and so on. The control section 301 controls the transmission signal generation section 302 to generate DCI (DCI for the DL-SRS) that commands receipt of this DL-SRS.

Here, the DCI for the DL-SRS may be either DCI (for example, DCI for DL data signals such as a DL assignment) that commands receipt of DL data signals (containing DL data signal scheduling information and DL-SRS scheduling information), or DCI that is provided apart from the DCI for DL data signals and that contains DL-SRS scheduling information.

Furthermore, the DCI for the DL-SRS may be a single DCI that commands receipt of a plurality of DL-SRSs that are associated with a plurality of antenna ports, respectively. Alternatively, the DCI for the DL-SRS may be DCI that is provided per antenna port and that commands receipt of the DL-SRS of the associated antenna port.

Furthermore, the control section 301 may control the feedback of CSIs that are generated using DL-SRSs (or at least one CSI that is generated using at least one DL-SRS). For example, the control section 301 controls the transmission signal generation section 302 to generate DCI that commands transmission of CSIs (DCI for CSI feedback).

Here, the DCI for CSI feedback may be either the above-described DCI for the DL-SRS containing CSI request information, or may be DCI that is different from the above DCI for the DL-SRS and that contains CSI request information.

When receipt of DL-SRSs and transmission of CSIs are commanded using the same DCI, the control section 301 may command transmission of the CSIs of associated antenna ports by using each antenna port's DCI, or command transmission of at least one CSI by using at least one antenna port's DCI. This at least one CSI may be configured in advance by higher layer signaling (static CSI codebook configuration), may be designated by the DCI, or may be reported from the user terminal (dynamic CSI codebook adaptation).

When receipt of DL-SRSs and transmission of CSIs are commanded using different DCIs, the control section 301 may command transmission of at least one CSI using DCI for CSI feedback. This at least one CSI may be configured in advance by higher layer signaling (static CSI codebook configuration), may be designated by the DCI, or may be reported from the user terminal (dynamic CSI codebook adaptation).

The transmission signal generation section 302 generates DL signals (DL control signals (DCI), DL data signals, DL reference signals, DL-SRS, etc.) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

The transmission signal generation section 302 generates, for example, a DL control signal (for example, a DL assignment) for reporting DL data signal scheduling information and/or DL-SRS scheduling information, and a DL control signal (for example, a UL grant) for reporting UL signal scheduling information and/or CSI request information, based on commands from the control section 301. Also, the DL data signals are subjected to the coding process, the modulation process and so on, by using coding rates and modulation schemes that are determined based on, for example, channel state information (CSI) from each user terminal 20.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, UL signals transmitted from the user terminals 20 (UL control signals, UL data signals, UL reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a feedback signal (for example, a HARQ-ACK) is received, this feedback signal is output to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 15:
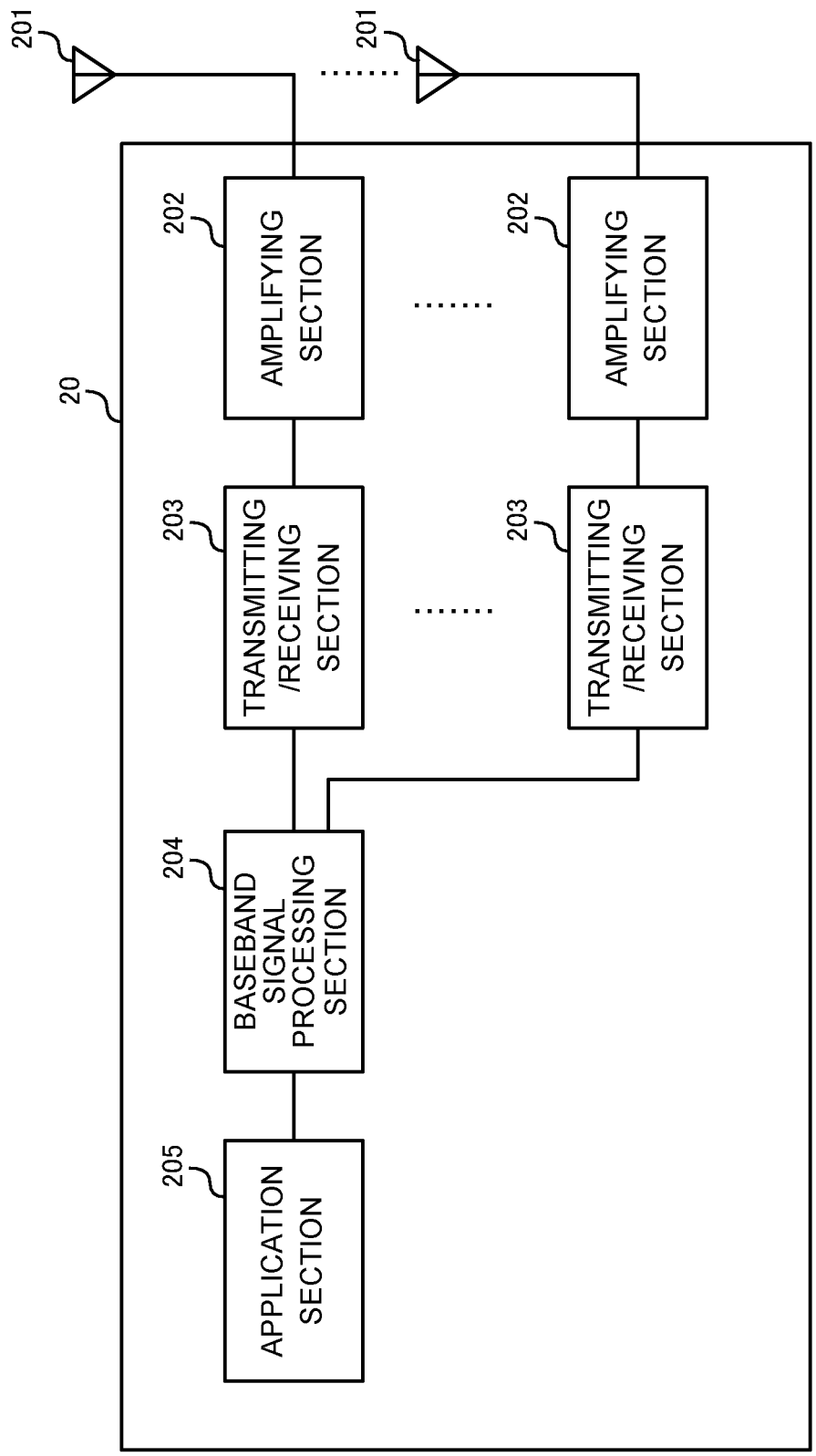
FIG. 15 is a diagram to show an example of an overall structure of a user terminal according to the present embodiment.

FIG. 15 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals, DL data signals, DL reference signals, discovery signals, synchronization signals, broadcast signals, DL-SRSs, etc.), and transmit UL signals (for example, UL control signals, UL data signals, UL reference signals, random access preambles, UL-SRSs, etc.). To be more specific, the transmitting/receiving sections 203 receive DL signals in DL frequencies and transmit UL signal in UL frequencies.

To be more specific, the transmitting/receiving sections 203 receive a DL-SRSs following a command from the control section 401 (first aspect). Furthermore, in the same subframe as that of this DL-SRS, the transmitting/receiving sections 203 receive DCI that commands receipt of this DL-SRS. In addition, the transmitting/receiving sections 203 may receive a plurality of DL-SRSs that are associated with a plurality of antenna ports respectively. Furthermore, in the same subframe as that of these multiple DL-SRSs, the transmitting/receiving sections 203 may receive DCI that commands receipt of these multiple DL-SRSs, or, receive, on a per antenna port basis, DCI that commands receipt of the DL-SRS.

Furthermore, the transmitting/receiving sections 203 transmit CSIs that are generated using the above-described DL-SRSs (second aspect). In addition, the transmitting/receiving sections 203 may receive DCI that commands transmission of these CSIs. Also, the transmitting/receiving sections 203 may transmit at least one antenna port's CSI. Also, the transmitting/receiving sections 203 may receive DCI that commands transmission of this at least one antenna port's CSI.

Figure 16:
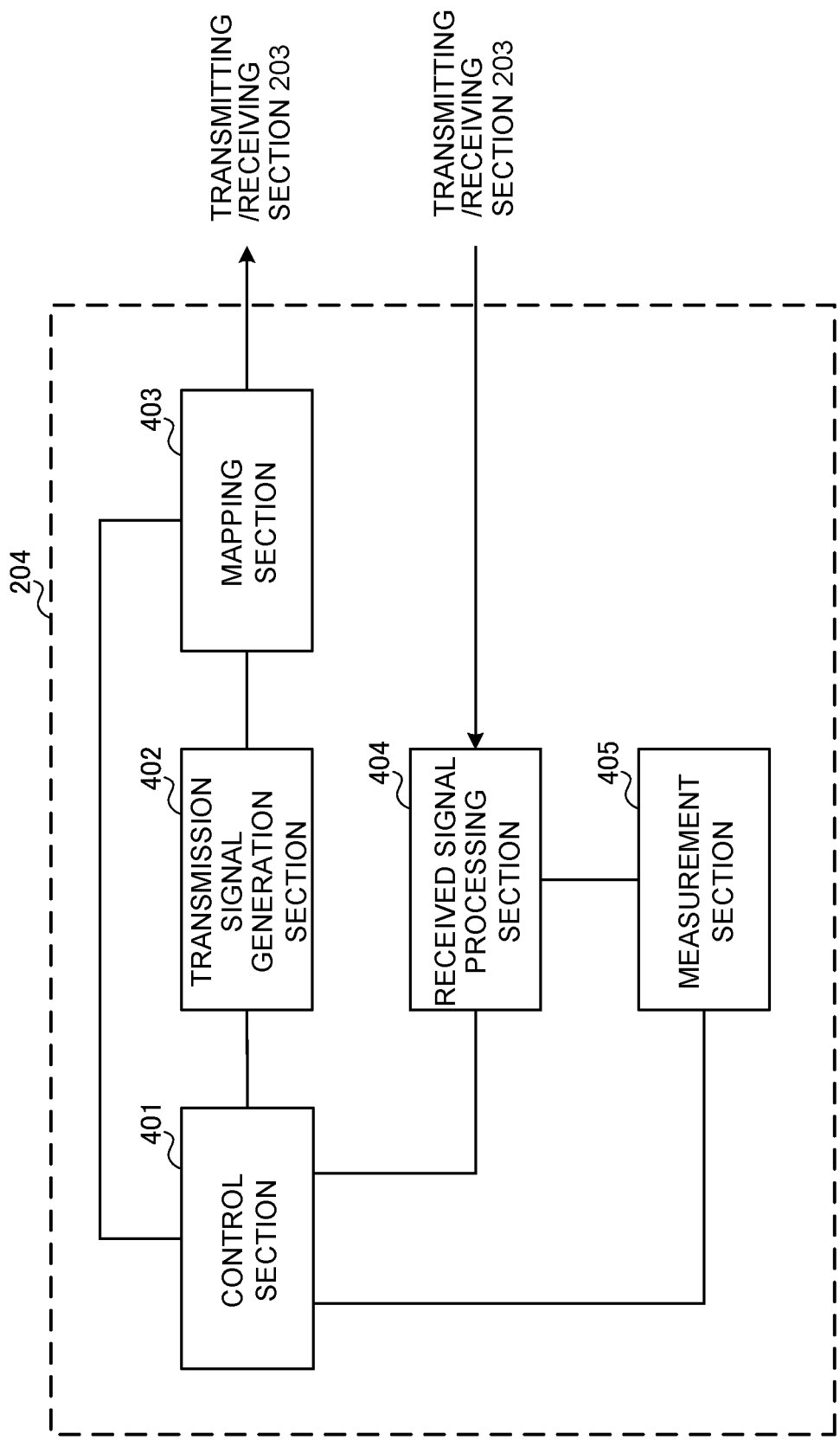
FIG. 16 is a diagram to show an example of a functional structure of a user terminal according to the present embodiment.

FIG. 16 is a diagram to show an example of a functional structure of a user terminal according to the present embodiment. Note that, although FIG. 16 primarily shows functional blocks that pertain to characteristic parts of the present embodiment, the user terminal 20 has other functional blocks that are necessary for radio communication as well. As shown in FIG. 16, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the DL control signals (signals transmitted in the PDCCH/EPDCCH) and DL data signals (signals transmitted in the PDSCH) transmitted from the radio base station 10, via the received signal processing section 404. The control section 401 controls the generation of feedback signals (for example, HARQ-ACKs and/or the like), UL data signals and so on, based on whether or not retransmission control is necessary, decided in response to the DL control signals and DL data signals, and so on.

The control section 401 controls the receipt of DL signals (for example, discovery signals, synchronization signals, broadcast signals, etc.) and/or the transmission of UL signals (for example, random access preambles), configured in advance in fixed subframes. Furthermore, the control section 401 controls the receipt of DL signals and/or the transmission of UL signals in dynamic subframes, dynamically or semi-dynamically.

Furthermore, the control section 401 controls the receipt of DL-SRSs (or the DL-SRS of at least one antenna port) based on DCI that is transmitted in the same subframe as that of the DL-SRSs. To be more specific, the control section 401 controls the receipt of DL-SRSs based on DL-SRS scheduling information (information to indicate whether or not DL-SRSs are transmitted and information to specify the DL sounding resource where the DL-SRSs are mapped) that is contained in the DCI.

Here, the DCI for the DL-SRS can be either DCI (including DCI for DL data signals, such as, for example, a DL assignment) that commands receipt of DL data signals (containing DL data signal scheduling information and DL-SRS scheduling information), or DCI that is provided apart from the above DCI for DL data signals and that contains DL-SRS scheduling information.

Furthermore, this DCI for the DL-SRS may be a single DCI that commands receipt of a plurality of DL-SRSs that are associated with a plurality of antenna ports, respectively. Alternatively, this DCI for the DL-SRS may be DCI that is provided for each antenna port to command receipt of the DL-SRS of the associated antenna port.

Furthermore, the control section 401 may control the feedback of CSIs (or at least one CSI that is generated using at least one DL-SRS) that are generated using DL-SRSs. For example, the control section 401 controls the transmission signal generation section 402 and/or the transmitting/receiving sections 203 to generate and/or transmit CSIs based on DCI that commands transmission of CSIs (DCI for CSI feedback).

Here, the DCI for CSI feedback may be either the above-described DCI for the DL-SRS containing CSI request information, or DCI that is different from the above DCI for DL-SRS and that contains CSI request information.

In the event receipt of DL-SRSs and transmission of CSIs are commanded using the same DCI, the control section 401 may control the generation and/or transmission of CSIs of associated antenna ports based on the DCI for each antenna port, control the generation and/or transmission of at least one CSI based on one antenna port's DCI. This at least one CSI may be configured in advance by higher layer signaling (static CSI codebook configuration), may be designated by the DCI, or may be reported from the user terminal (dynamic CSI codebook adaptation).

When receipt of DL-SRSs and transmission of CSIs are commanded using different DCIs, the control section 401 may control the generation and/or transmission of at least one CSI. This at least one CSI may be configured in advance by higher layer signaling (static CSI codebook configuration), may be designated by the DCI, or may be reported from the user terminal (dynamic CSI codebook adaptation).

The transmission signal generation section 402 generates UL signals (UL control signals, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates UL control signals related to delivery acknowledgement information, channel state information (CSI) and so on, based on commands from the control section 401. Also, the transmission signal generation section 402 generates UL data signals based on commands from the control section 401. For example, when a UL grant is contained in a DL control signal that is reported from the radio base station 10, the control section 401 commands the transmission signal generation section 402 to generate a UL data signal.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, DL signals (DL control signals, DL data signals, DL reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 blind-decodes the DL control signals (DCI format) that schedules transmission and/or receipt of data (TBs: Transport Blocks), based on commands from the control section 401. For example, the received signal processing section 404 may be configured to blind-decode different radio resources based on whether or not the subframes are self-contained subframes.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ), the channel states and so on of the received signals. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 17:
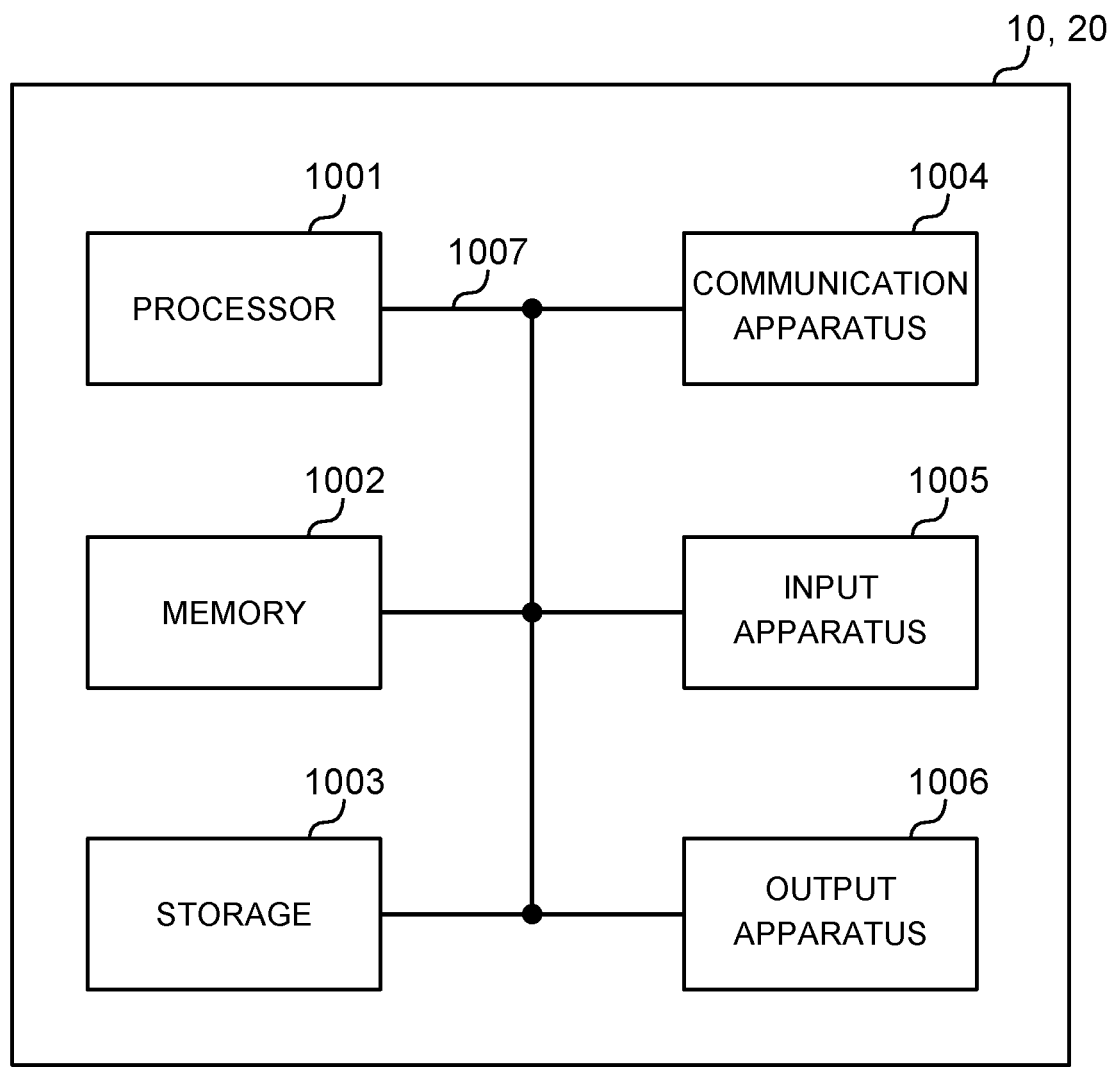
FIG. 17 is a diagram to show an example of a hardware structure of a radio base station and a user terminal according to the present embodiment.

That is, a radio base station, a user terminal and so on according to an embodiment of the present invention may function as a computer that executes the processes of the radio communication method of the present invention. FIG. 17 is a diagram to show an example of a hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory (primary storage apparatus)" and so on. The memory 1002 can store executable programs (program codes), software modules and the like for implementing the radio communication methods according to present embodiment.

The storage 1003 is a computer-readable recording medium, and is configured with at least one of an optical disk such as a CD-ROM (Compact Disc ROM), a hard disk drive, a flexible disk, a magneto-optical disk, a flash memory and so on. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this.

A TTI having a time duration of one ms may be referred to as a "normal TTI (TTI in LTE Rel. 8 to 12)," a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

The aspects/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the aspects/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-059127, filed on Mar. 23, 2016, including the specification, drawings and abstract, is incorporated herein by reference in its entirety.

The invention claimed is:

1. A terminal comprising:
a receiver that receives downlink control information (DCI) including information that indicates a resource for a reference signal for measurement; and
a processor that controls generation of channel state information (CSI) using the reference signal that is triggered by the DCI,
wherein the resource indicated by the information in each DCI is associated with one or more antenna ports, and
wherein the information and common control information that is common among the one or more antenna ports are joint-encoded.

2. The terminal according to claim 1, wherein the resource is indicated, by the information included in the DCI, from candidates configured by higher layer signaling.

3. The terminal according to claim 1, wherein the processor controls transmission of the CSI using an uplink shared channel that is scheduled by the DCI.

4. The terminal according to claim 1, wherein the processor controls transmission of the CSI at a timing that is indicated by the DCI.

5. A radio base station comprising:
a transmitter that transmits downlink control information (DCI) including information that indicates a resource for a reference signal for measurement; and
a processor that controls reception of channel state information that is generated using the reference signal triggered by the DCI,
wherein the resource indicated by the information in each DCI is associated with one or more antenna ports, and
wherein the information and common control information that is common among the one or more antenna ports are joint-encoded.

6. The terminal according to claim 2, wherein the processor controls transmission of the CSI using an uplink shared channel that is scheduled by the DCI.

7. The terminal according to claim 2, wherein the processor controls transmission of the CSI at a timing that is indicated by the DCI.

8. The terminal according to claim 3, wherein the processor controls transmission of the CSI at a timing that is indicated by the DCI.

* * * * *